US012375847B2

(12) United States Patent
Kato et al.

(10) Patent No.: US 12,375,847 B2
(45) Date of Patent: Jul. 29, 2025

(54) PHONE BOOTH AND METHOD OF CONTROLLING OUTPUT OF DIRECTIONAL SPEAKER

(71) Applicant: Yamaha Corporation, Hamamatsu (JP)

(72) Inventors: Shinichi Kato, Hamamatsu (JP); Yoshifumi Oizumi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 370 days.

(21) Appl. No.: 18/076,674

(22) Filed: Dec. 7, 2022

(65) Prior Publication Data

US 2023/0199375 A1 Jun. 22, 2023

(30) Foreign Application Priority Data

Dec. 16, 2021 (JP) ................................ 2021-203914
Mar. 16, 2022 (JP) ................................ 2022-041535

(51) Int. Cl.

*H04R 1/34* (2006.01)
*G10K 11/175* (2006.01)
*H04R 1/08* (2006.01)

(52) U.S. Cl.

CPC ......... *H04R 1/345* (2013.01); *G10K 11/1752* (2020.05); *H04R 1/08* (2013.01); *H04R 2201/021* (2013.01)

(58) Field of Classification Search

CPC ........... G10K 11/1752; G10K 11/1754; G10K 11/32; H04R 2201/021; H04R 3/005; H04R 3/12; H04R 5/02

See application file for complete search history.

(56) References Cited

FOREIGN PATENT DOCUMENTS

| | | | |
|---|---|---|---|
| JP | H06175666 A | * | 6/1994 |
| JP | 2016052049 A | * | 4/2016 |

* cited by examiner

*Primary Examiner* — Kile O Blair
(74) *Attorney, Agent, or Firm* — ROSSI, KIMMS & McDOWELL LLP

(57) ABSTRACT

A panel combination includes a panel, a directional speaker mounted to the panel, and a controller that receives a trigger signal and controls an output of the directional speaker according to the trigger signal.

8 Claims, 30 Drawing Sheets

PHONE BOOTH AND METHOD OF CONTROLLING OUTPUT OF DIRECTIONAL SPEAKER

CROSS REFERENCE TO RELATED APPLICATIONS

This Nonprovisional application claims priority under 35 U.S.C. § 119(a) on Patent Application No. 2021-203914 filed in Japan on Dec. 16, 2021 and Japanese Patent Application No. 2022-041535, filed on Mar. 16, 2022, the entire contents of which are hereby incorporated by reference.

BACKGROUND

Technical Field

An embodiment of the present disclosure relates to a panel combination, a phone booth, and a method of controlling an output of a directional speaker.

Background Information

Japanese Unexamined Patent Application Publication No. 2016-52049 discloses sound environment control device that emits a masking sound when detecting a masking target, and does not emit a masking sound when detecting no masking target.

The disclosure described in Japanese Unexamined Patent Application Publication No. 2016-52049 is not a disclosure relating to a phone booth being a simple soundproof room. The phone booth being a simple soundproof room needs to be a place in which emergency broadcasting is able to be heard with a default volume, by order of the Fire Department. Therefore, the phone booth has to allow some degree of sound intrusion or sound leakage. On the other hand, installation of a speaker for outputting a masking sound as disclosed in Japanese Unexamined Patent Application Publication No. 2016-52049 impairs the advantage of a phone booth that is able to be easily installed, disassembled, relocated, or the like.

SUMMARY

In view of the foregoing, one aspect of the present disclosure is directed to provide a panel combination capable of, while allowing sound intrusion or sound leakage of a phone booth, reducing influence of the sound intrusion or the sound leakage, and impairing no advantage of the phone booth.

A panel combination according to an embodiment of the present disclosure includes a panel, a directional speaker mounted to the panel, and a controller that receives a trigger signal and controls an output state of the directional speaker according to the trigger signal.

According to an embodiment of the present disclosure, a panel combination capable of, while allowing sound intrusion or sound leakage of a phone booth, reducing influence of the sound intrusion or the sound leakage, and impairing no advantage of the phone booth is able to be provided.

DETAILED DESCRIPTION

Figure 1:
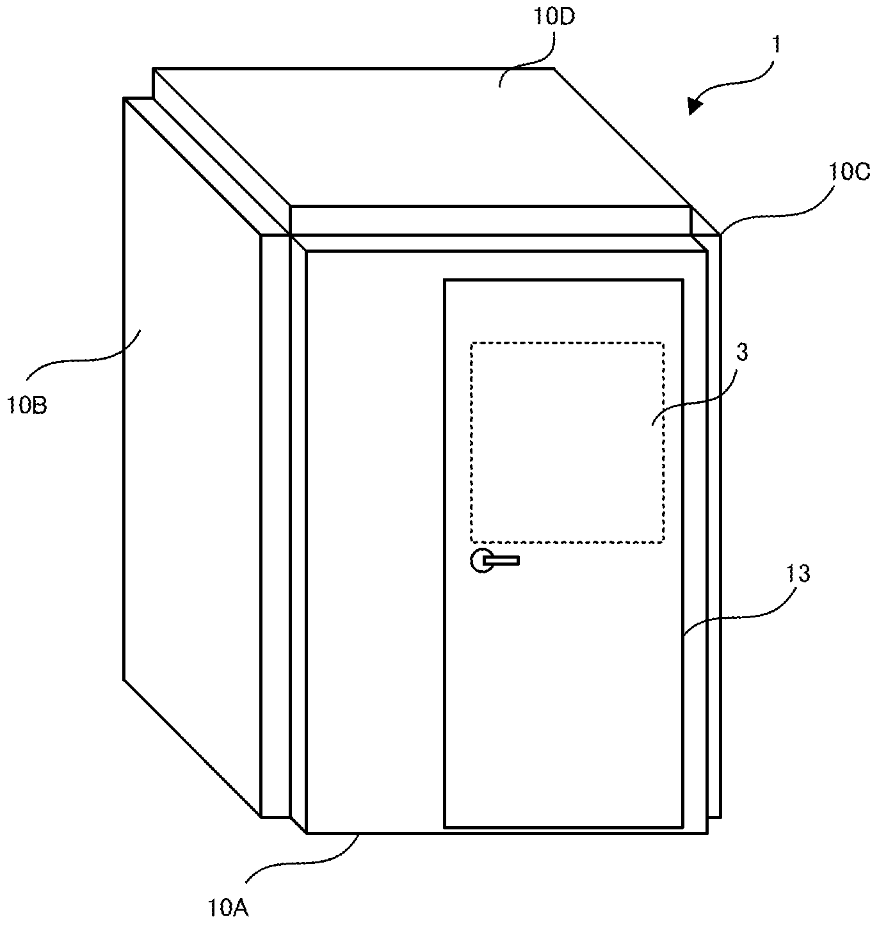
FIG. 1 is a perspective view showing a phone booth 1.
Figure 2:
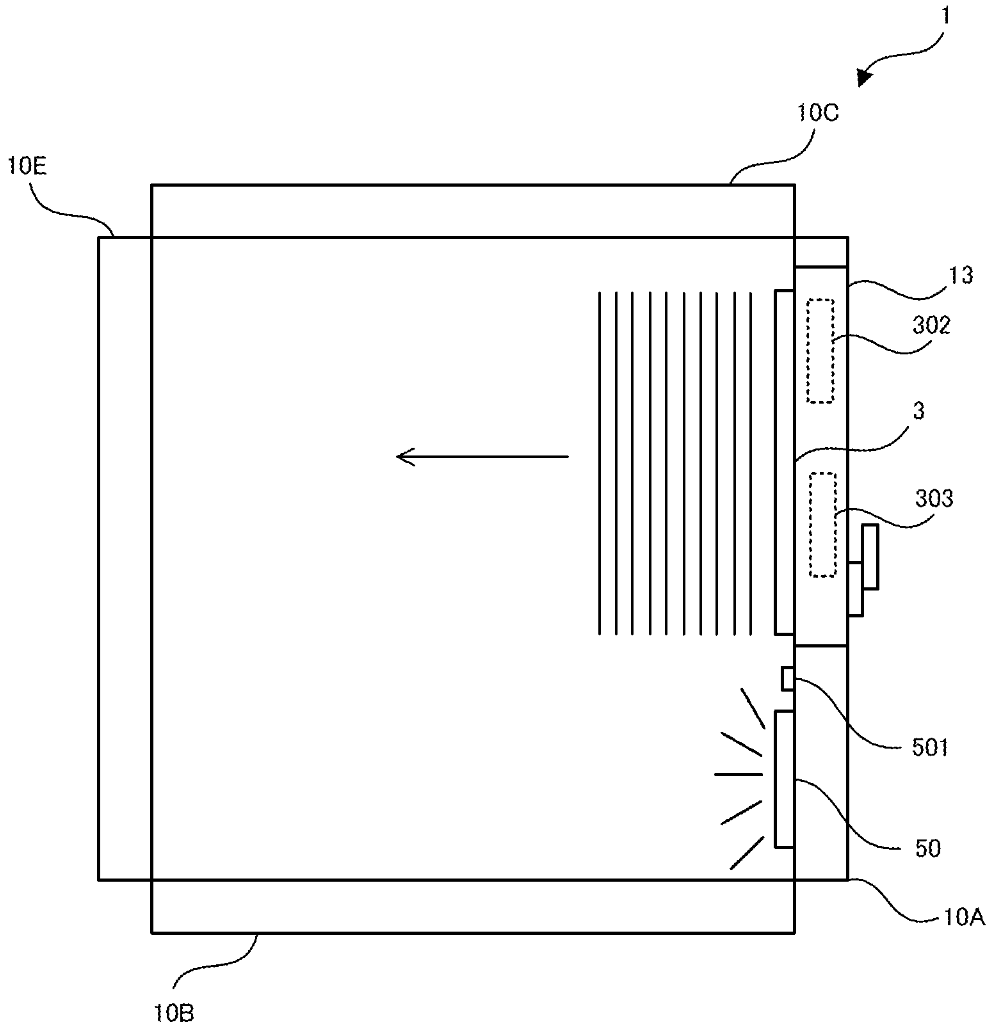
FIG. 2 is a plan view of an inside of the phone booth 1 in a plan view.
Figure 3:
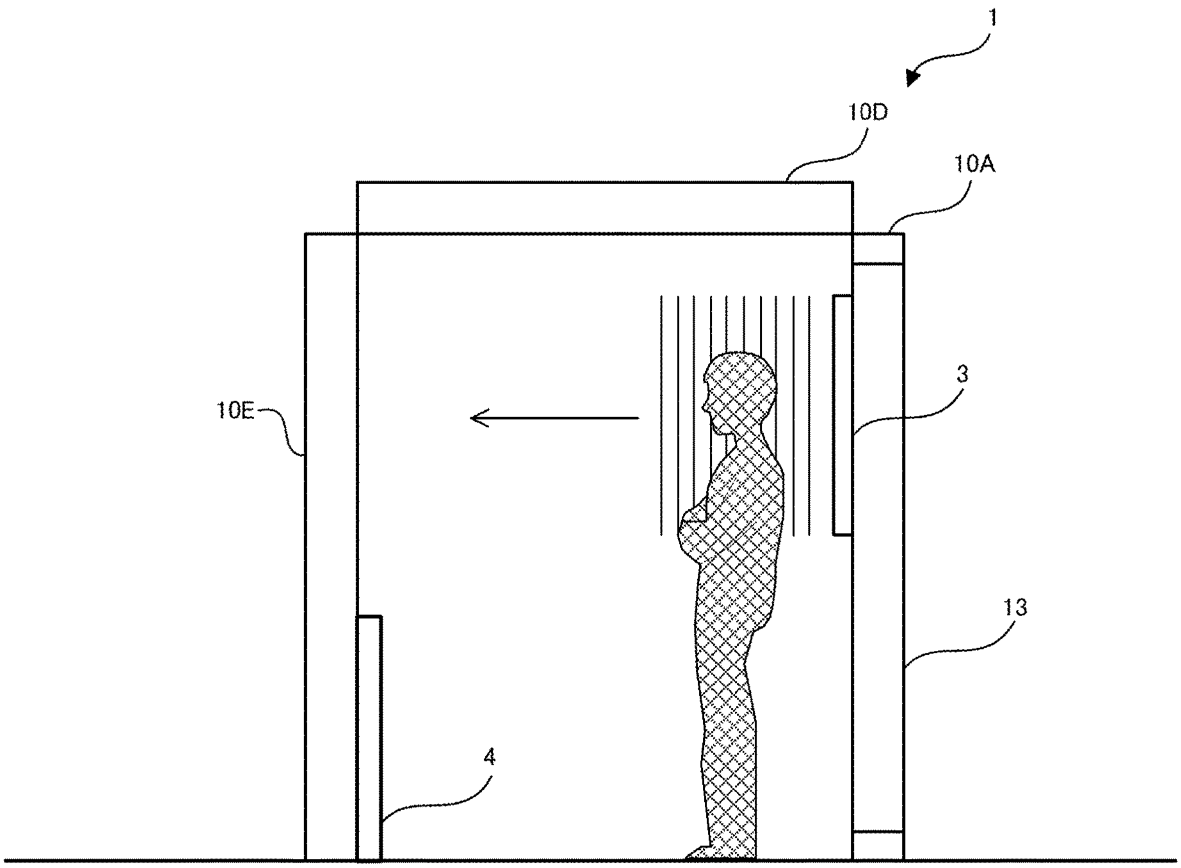
FIG. 3 is an elevational view of the inside of the phone booth 1 in an elevation view.
Figure 4:
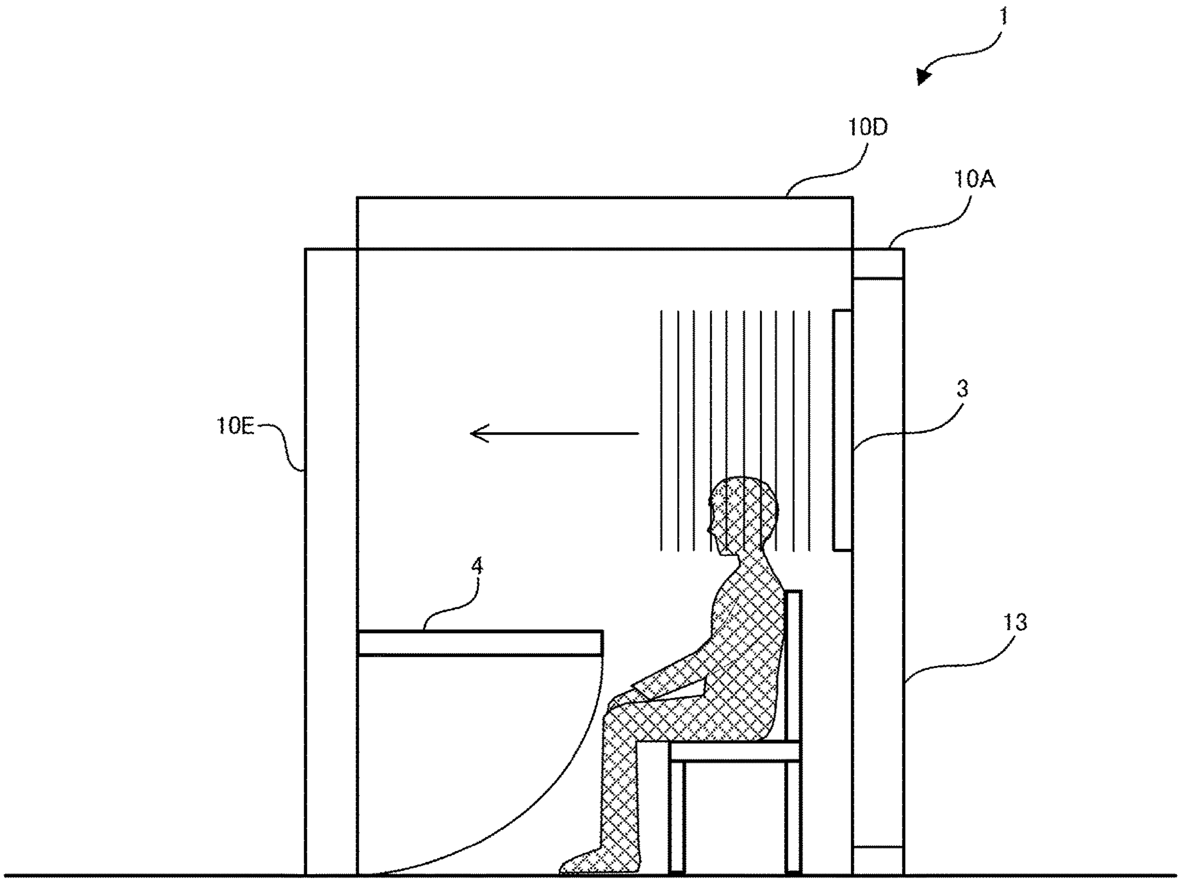
FIG. 4 is an elevational view of the inside of the phone booth 1 in an elevation view.

FIG. 1 is a perspective view showing a phone booth 1 according to the present embodiment. FIG. 2 is a plan view of an inside of the phone booth 1 in a plan view. FIG. 3 and FIG. 4 are elevational views of the inside of the phone booth 1 in an elevation view.

The phone booth 1 is configured by combining a plurality of panels. The phone booth 1 according to the present embodiment is configured by five panels including a panel 10A, a panel 10B, a panel 10C, a panel 10D, and a panel 10E.

The panel 10A is disposed in front of the phone booth 1. The panel 10B and the panel 10C are disposed on left side and right side of the phone booth 1. The panel 10D is disposed on top of the phone booth 1. The panel 10E is disposed in back of the phone booth 1.

Each of the panel 10A, the panel 10B, the panel 10C, the panel 10D, and the panel 10E has a thin plate shape. The panel 10A, the panel 10B, the panel 10C, and the panel 10E have a vertically long rectangular wall surface. The panel 10A, the panel 10B, the panel 10C, and the panel 10E are connected to each other at a long side of the wall surface. The panel 10D has a square shape. Each side of the panel 10D is connected to a short side of the wall surface of the panel 10A, the panel 10B, the panel 10C, and the panel 10E. As a result, the phone booth 1 being a simple soundproof room is configured.

The panel 10A includes a door 13. A user of the phone booth 1 opens and closes the door 13, and has access to the inside of the phone booth 1. The panel 10A also includes a lighting 50 on the wall surface of the inside of the phone booth 1. The lighting 50 illuminates the inside of the phone booth 1.

The panel 10A includes a switch 501 to turn on and off the lighting 50. The user, when using the phone booth 1, opens the door 13, enters the phone booth 1, and turns on the switch 501 to turn on the lighting 50. In addition, the user, when finishing using the phone booth 1, turns off the switch 501 to turn off the lighting 50, opens the door 13, and goes out of the phone booth 1.

The panel 10A is an example of a panel combination of the present disclosure. The panel combination includes at least one panel and a flat speaker 3 to configure the panel combination. For convenience, the panel combination of the present disclosure is hereinafter referred to as panel 10A. The flat speaker 3 is an example of a directional speaker of the present disclosure. The flat speaker 3 is disposed on the wall surface of the panel 10A of the inside of the phone booth 1. More specifically, in this example, the flat speaker 3 is disposed on the door 13. The sound emitting direction of the flat speaker 3 is directed to a portion (the wall surface of the panel 10E) that faces the wall surface on which the flat speaker 3 is installed. In other words, the sound emitting direction of the flat speaker 3 is directed to the inside of the phone booth 1.

The flat speaker 3, as shown in FIG. 3 and FIG. 4, outputs sound to a predetermined range including a head position, in both when the user stands in the phone booth 1 and when sits down in the phone booth 1. It is to be noted that, in this example, the panel 10E includes a folding table 4. As shown in FIG. 4, the user, when sitting down in the phone booth 1, can use the table 4 as a working table by pulling out the table 4.

The flat speaker 3 is connected to a device (an acoustic device that outputs a masking sound, an acoustic device that outputs a content sound, an information processing apparatus, or the like, for example) that outputs an audio signal. The flat speaker 3 receives the audio signal from the device that outputs an audio signal. The flat speaker 3 reproduces a received audio signal and outputs sound. Accordingly, the flat speaker 3 outputs a masking sound, for example.

A masking sound is sound to prevent an outsider (a user who is inside the phone booth 1 in this example) from understanding the content of conversation. The masking sound may preferably include a disturbing sound that disturbs a voice, a background sound that occurs continuously, and a production sound that occurs intermittently. The disturbing sound, for example, is used such that a voice of a person is changed on a time axis or a frequency axis and lexically makes no sense (the content is not understandable). The disturbing sound, although having human voice quality, is unrecognizable as a conversational voice uttered by a person. Therefore, the disturbing sound may give a listener an uncomfortable feeling and may cause discomfort when the listener hears the sound for a long time or at an excessive volume. Accordingly, the disturbing sound may preferably be combined with the background sound and the production sound. The background sound is sound such as a murmur of a stream or a rustle of trees, for example, and a comfortable sound to which the outsider is not likely to pay attention. As a result, the background sound is able to reduce the uncomfortable feeling of the disturbing sound and the discomfort when a background noise level is raised and the disturbing sound is made unnoticeable. In addition, the production sound is a high production sound such as an intermittent musical note. As a result, the production sound also draws an attention of the outsider to the production sound, and makes the uncomfortable feeling of the disturbing sound less noticeable from an auditory psychological perspective.

When a conversation sound internally intrudes from the outside of the phone booth 1, the concentration of the user of the phone booth 1 may be obstructed. The flat speaker 3, by outputting the masking sound as described above, is able to reduce noisy feeling of the conversation sound that internally intrudes from the outside of the phone booth 1 and increase the concentration of a person who is inside the phone booth 1.

Alternatively, the flat speaker 3 may output a content sound. In addition, the flat speaker 3 may output the sound received from an information processing apparatus. The information processing apparatus may be connected to a different information processing apparatus at a remote place, for example, through a network. The information processing apparatus connected to the flat speaker 3 receives an audio signal from the remote place through the network. Accordingly, the flat speaker 3 may output a voice of a user at the remote place.

The flat speaker 3 has a flat plate shape with a small thickness. The flat speaker 3 is an electrostatic speaker, for example. The electrostatic speaker is structured to interpose a sheet-like vibrating plate between two fixed electrodes. The electrostatic speaker generates an electrostatic force by applying a voltage to the fixed electrodes and the vibrating plate. The electrostatic speaker changes the electrostatic force by changing the voltage applied to the fixed electrodes. The electrostatic speaker vibrates the vibrating plate due to a change in the electrostatic force. Accordingly, the flat speaker 3 outputs a planar sound wave. The flat speaker 3 outputs sound with strong directivity in a front direction (a normal direction of a main surface) of the flat speaker 3.

Accordingly, the sound to be outputted by the flat speaker 3 reaches a facing wall surface of the panel 10E without largely spreading out. Therefore, the sound to be outputted by the flat speaker 3 does not easily leak out of the phone booth 1 being a simple soundproof room.

Figure 5:
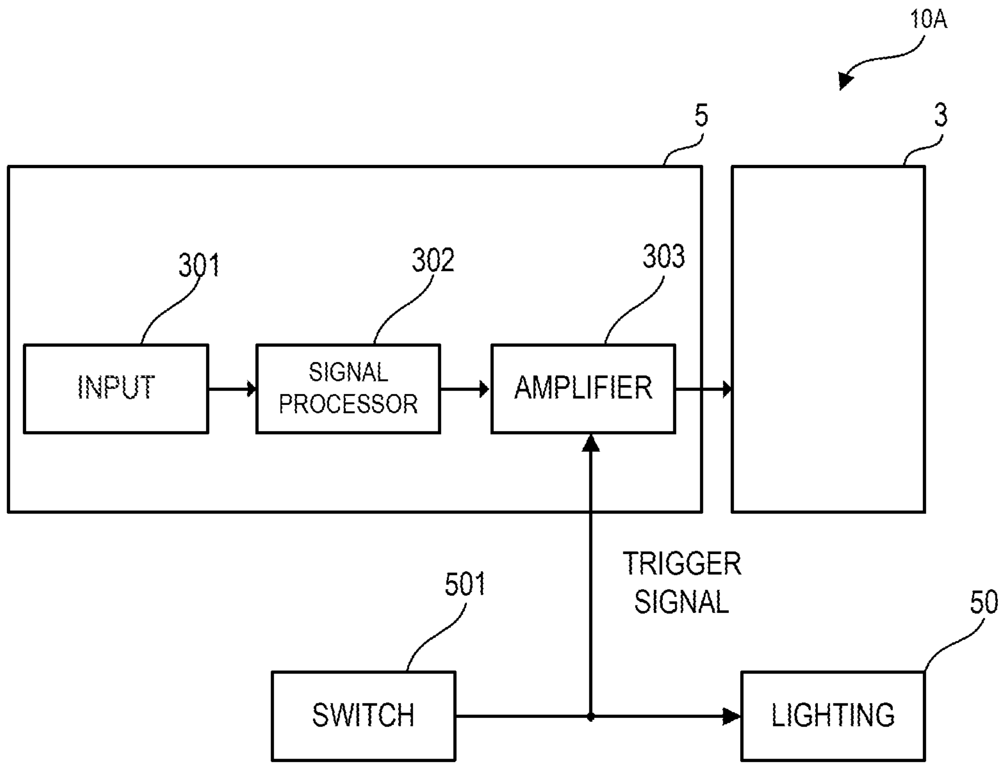
FIG. 5 is a block diagram showing a hardware configuration provided in a panel 10A including a flat speaker 3.

FIG. 5 is a block diagram showing a hardware configuration provided in the panel 10A including the flat speaker 3. The flat speaker 3 is connected to an amplifier unit 5 for driving the flat speaker 3. The amplifier unit 5 includes an input 301, a signal processor 302, and an amplifier 303.

The input 301 includes an analog audio I/F, a digital audio I/F, or a communication I/F such as a USB. The input 301 receives an audio signal from a device (an acoustic device that outputs a masking sound, an acoustic device that outputs a content sound, an information processing apparatus, or the like, for example) that outputs an audio signal. The signal processor 302 performs signal processing on the audio signal received by the input 301. For example, the signal processor 302 performs level control of the audio signal, or adjustment of frequency characteristics or the like. It is to be noted that the signal processor 302, in a case in which the input 301 receives an analog audio signal, converts the analog audio signal into a digital audio signal, and then performs signal processing. The signal processor 302 converts the audio signal on which the signal processing has been performed, into an analog audio signal, and outputs the analog audio signal to the amplifier 303.

The amplifier 303 amplifies the audio signal on which the signal processing has been performed by the signal processor 302. The amplifier 303 outputs an amplified audio signal to the flat speaker 3. The flat speaker 3 outputs sound based on the audio signal amplified by the amplifier 303.

The amplifier 303 receives a trigger signal from the switch 501. The trigger signal is a signal for turning on and off the lighting 50. When a user turns on the switch 501, the switch 501 outputs an ON signal to the lighting 50 and the amplifier 303, as the trigger signal. Each of the lighting 50 and the amplifier 303 is powered on according to the trigger signal. In addition, when the user turns off the switch 501, the switch 501 outputs an OFF signal to the lighting 50 and the amplifier 303, as the trigger signal. Each of the lighting 50 and the amplifier 303 is powered off according to the trigger signal. In such a case, the amplifier 303 is an example of a controller that controls the output of the directional speaker according to the trigger signal.

In this manner, the flat speaker 3 according to the present embodiment turns on and off the power of the amplifier 303 in conjunction with on and off of the switch of an electrical components (the lighting 50 in this example) installed in the phone booth 1. The flat speaker 3 and the electrical component are collected in the one panel 10A, and powered on and off in conjunction with each other. Therefore, a worker who builds a phone booth does not need to wire the electrical component over a plurality of panels. Therefore, the panel 10A according to the present embodiment does not impair the advantage of the phone booth that is able to be easily installed, disassembled, relocated, or the like.

In addition, the phone booth being a simple soundproof room needs to be a place in which emergency broadcasting is able to be heard with a default volume, by order of the Fire Department. Therefore, the phone booth has to allow some degree of sound intrusion. The flat speaker 3 according to the present embodiment is able to mask sound that intrudes from the outside of the phone booth 1, by outputting a masking sound. In particular, in the above example, the flat speaker 3 is installed in the door 13 of the phone booth 1 into which sound easily intrudes. Therefore, when the flat speaker 3 outputs a masking sound, the masking effect of the masking sound is able to be maximized.

It is to be noted that, in the above example, the flat speaker 3, although being installed in the panel 10A with the door 13, may be installed in any of the panel 10B, the panel 10C, the panel 10D, and the panel 10E. In addition, the flat speaker 3 may be installed at another position (near a fan of an air vent, for example) of the phone booth 1 into which sound easily intrudes.

Figure 6:
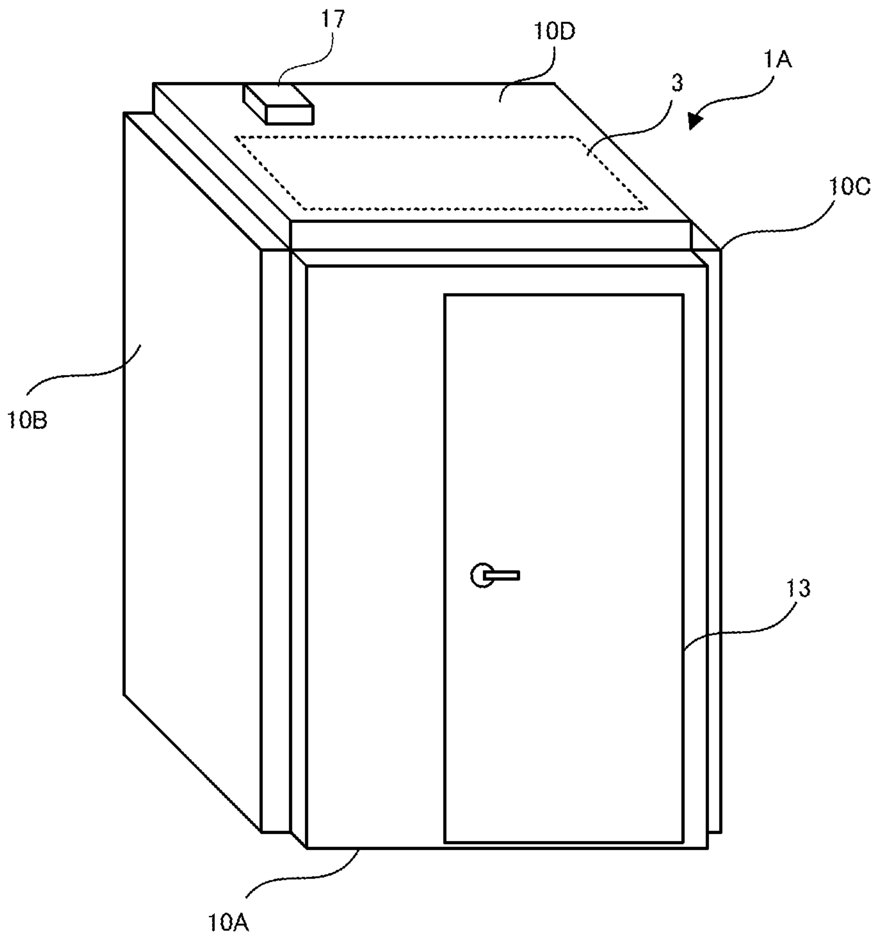
FIG. 6 is a perspective view showing a phone booth 1A according to a first modification.
Figure 7:
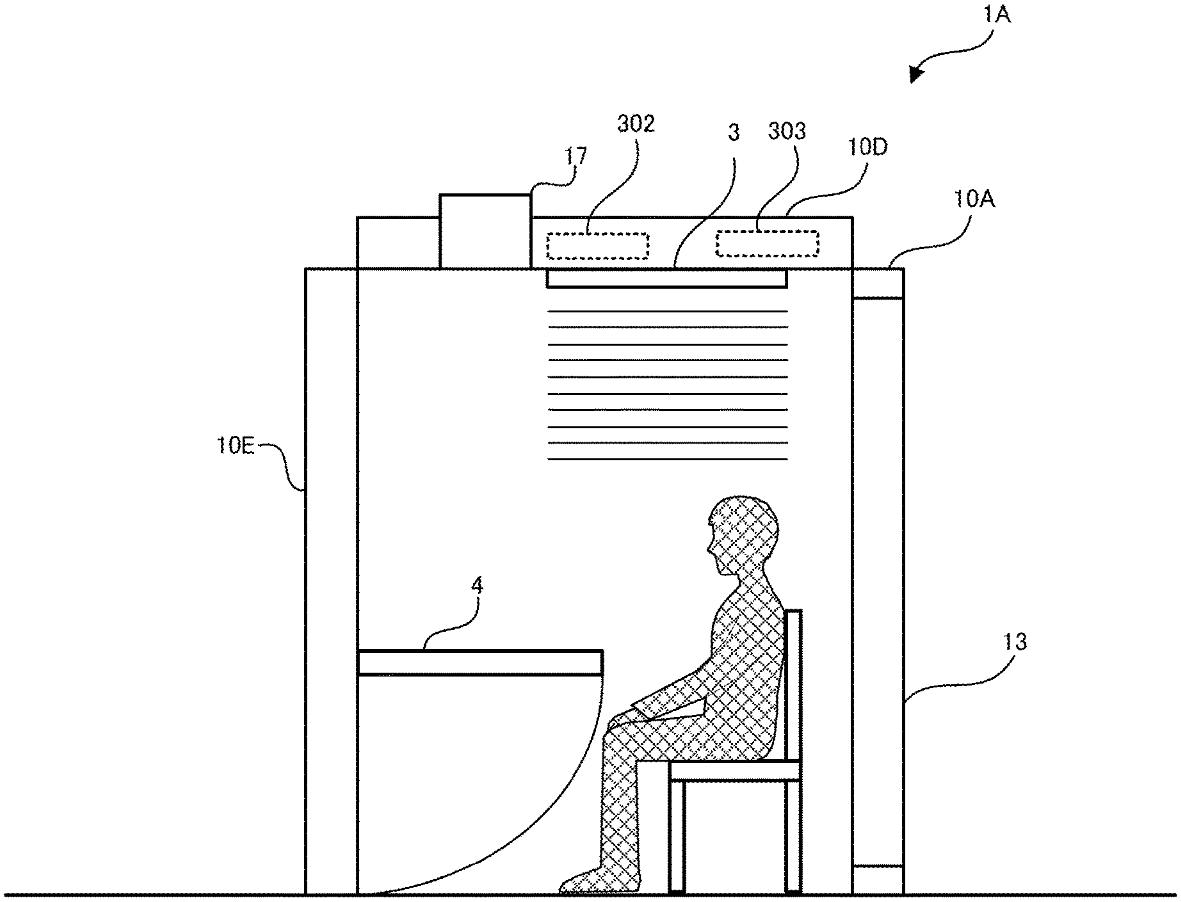
FIG. 7 is a plan view of an inside of the phone booth 1A in a plan view.
Figure 8:
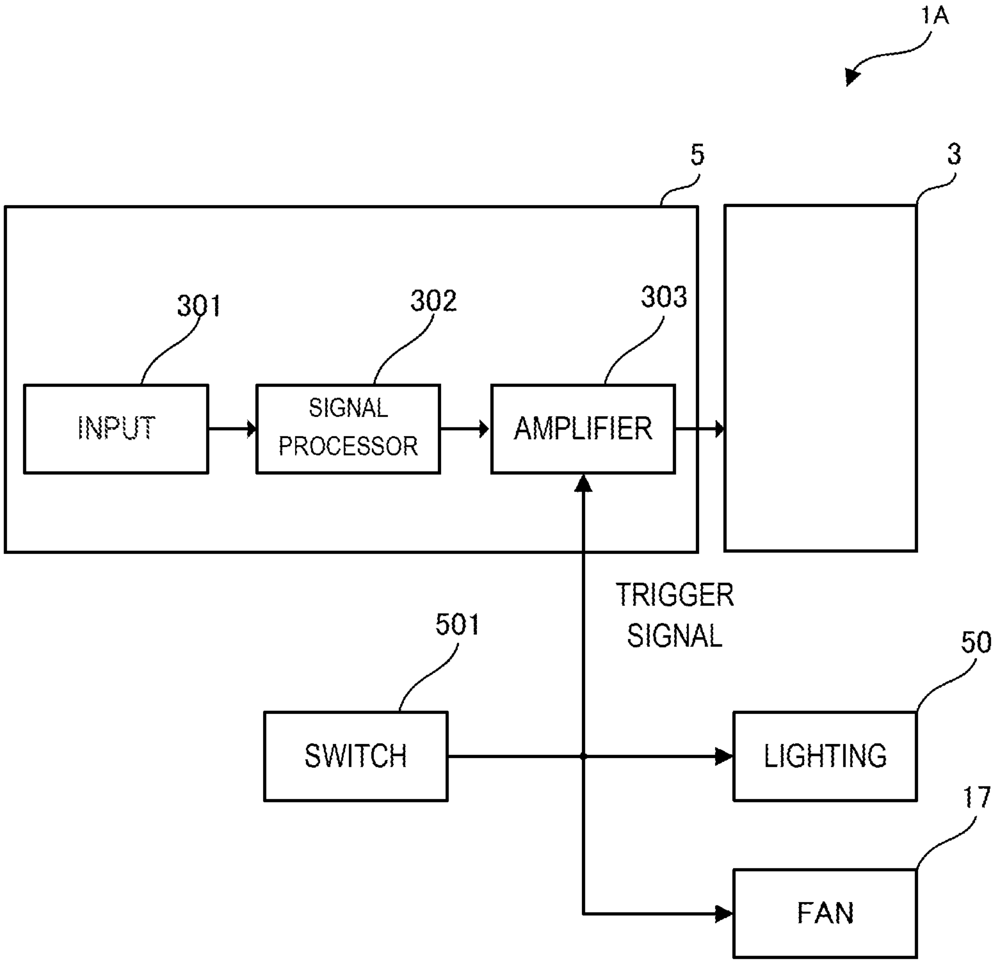
FIG. 8 is a block diagram showing a hardware configuration of the phone booth 1A according to the first modification.

Subsequently, FIG. 6 is a perspective view showing a phone booth 1A according to a first modification. The same reference numerals are used to refer to components common to FIG. 1, and the description will be omitted. FIG. 7 is a plan view of an inside of the phone booth 1A in a plan view. The same reference numerals are used to refer to components common to FIG. 4, and the description will be omitted. FIG. 8 is a block diagram showing a hardware configuration of the phone booth 1A according to the first modification. The same reference numerals are used to refer to components common to FIG. 5, and the description will be omitted.

The phone booth 1A according to the first modification includes a flat speaker 3 and a fan 17 in the panel 10D placed on a ceiling surface. The fan 17 is attached to an air vent of the panel 10D and ventilates the phone booth 1A. The fan 17 receives a trigger signal from the switch 501. In short, the switch 501 according to the first modification turns on and off the power of the lighting 50, the fan 17, and the amplifier 303.

The flat speaker 3 is placed in the panel 10D being a ceiling surface of the inside of the phone booth 1A. The sound emitting direction of the flat speaker 3 is directed to a floor surface. As a result, the sound to be outputted by the flat speaker 3 reaches a user so as to pour down from a head. The user cannot easily feel localization of sound to a plane wave that reaches from above the head. Therefore, the user can more naturally listen to the sound outputted from the flat speaker 3. In addition, the flat speaker 3, in the phone booth 1A, is installed near the fan 17 into which sound easily intrudes. Therefore, when the flat speaker 3 outputs a masking sound, the masking effect of the masking sound is able to be maximized.

The panel 10A and the panel 10D are previously wired to send and receive a trigger signal of the switch 501 in order to turn on and off the power of the lighting 50 and the fan 17. The flat speaker 3 according to the present embodiment, by only connecting wiring to send and receive the trigger signal to the amplifier 303, is able to turn on and off the power of the amplifier 303 in conjunction with the on and off of the switch 501. Accordingly, the worker who builds a phone booth does not need to apply new wiring only for the flat speaker 3. Therefore, the panel 10A and the panel 10D according to the present embodiment do not impair the advantage of the phone booth that is able to be easily installed, disassembled, relocated, or the like.

It is to be noted that, in the phone booth 1A according to the first modification, the flat speaker 3, although being installed in the panel 10D being the ceiling surface, may be installed in any of the panel 10A, the panel 10B, the panel 10C, and the panel 10E. In addition, the flat speaker 3 may be installed at another position (near the door 13, for example) of the phone booth 1 into which sound easily intrudes.

Figure 9:
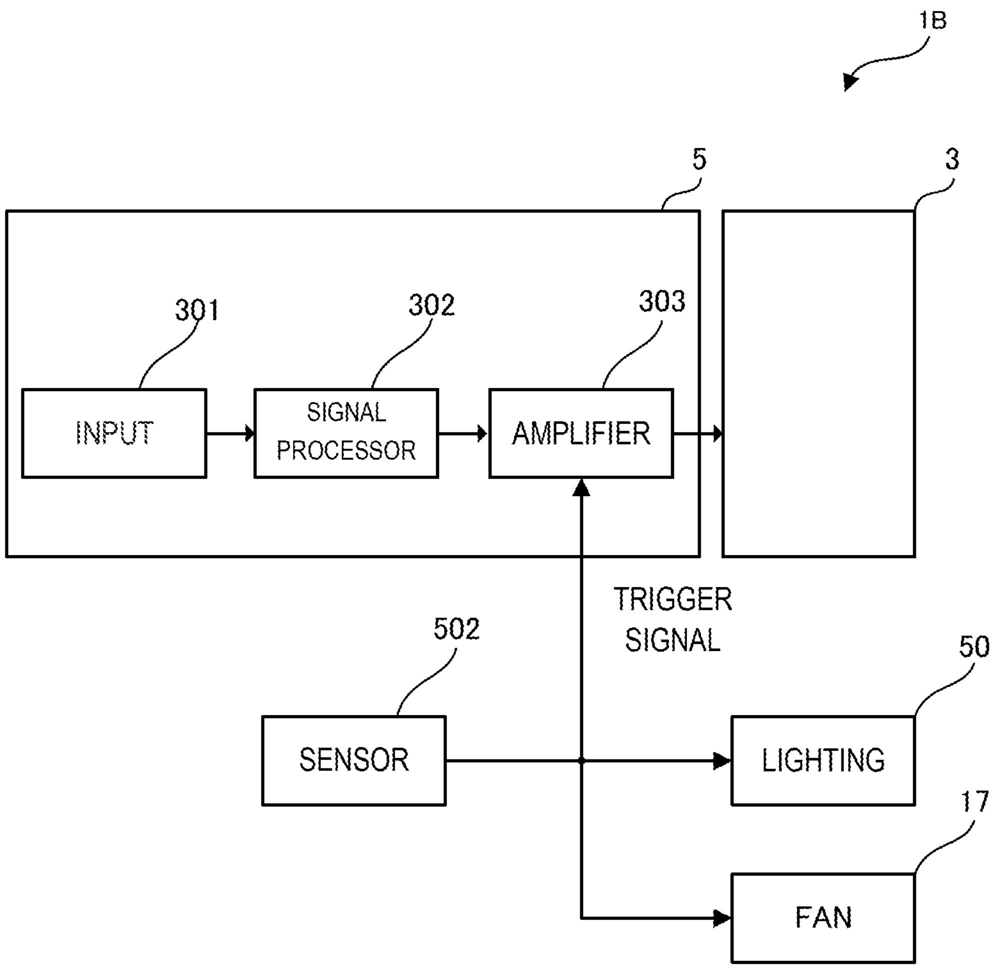
FIG. 9 is a block diagram showing a hardware configuration of a phone booth 1B according to a second modification.

FIG. 9 is a block diagram showing a hardware configuration of a phone booth 1B according to a second modification. The same reference numerals are used to refer to components common to FIG. 8, and the description will be omitted. The phone booth 1B includes a sensor 502 in place of the switch 501. Other configurations are the same as the configurations of the phone booth 1A of the first modification.

The sensor 502 includes a human detection sensor or an opening and closing sensor of a door, for example. The sensor 502, in a case of detecting a person inside the phone booth 1, outputs an ON signal as a trigger signal, to the lighting 50, the fan 17, and the amplifier 303. The sensor 502, when a predetermined time elapses after no person is detected inside the phone booth 1, outputs an OFF signal as a trigger signal, to the lighting 50, the fan 17, and the amplifier 303. The lighting 50, the fan 17, and the amplifier 303 are powered on and off according to the trigger signal (the ON and OFF signal).

In the phone booth 1B according to the second modification as well, the worker does not need to apply new wiring only for the flat speaker 3. Therefore, the panel 10A and the panel 10D according to the present embodiment do not impair the advantage of the phone booth that is able to be easily installed, disassembled, relocated, or the like.

Figure 10:
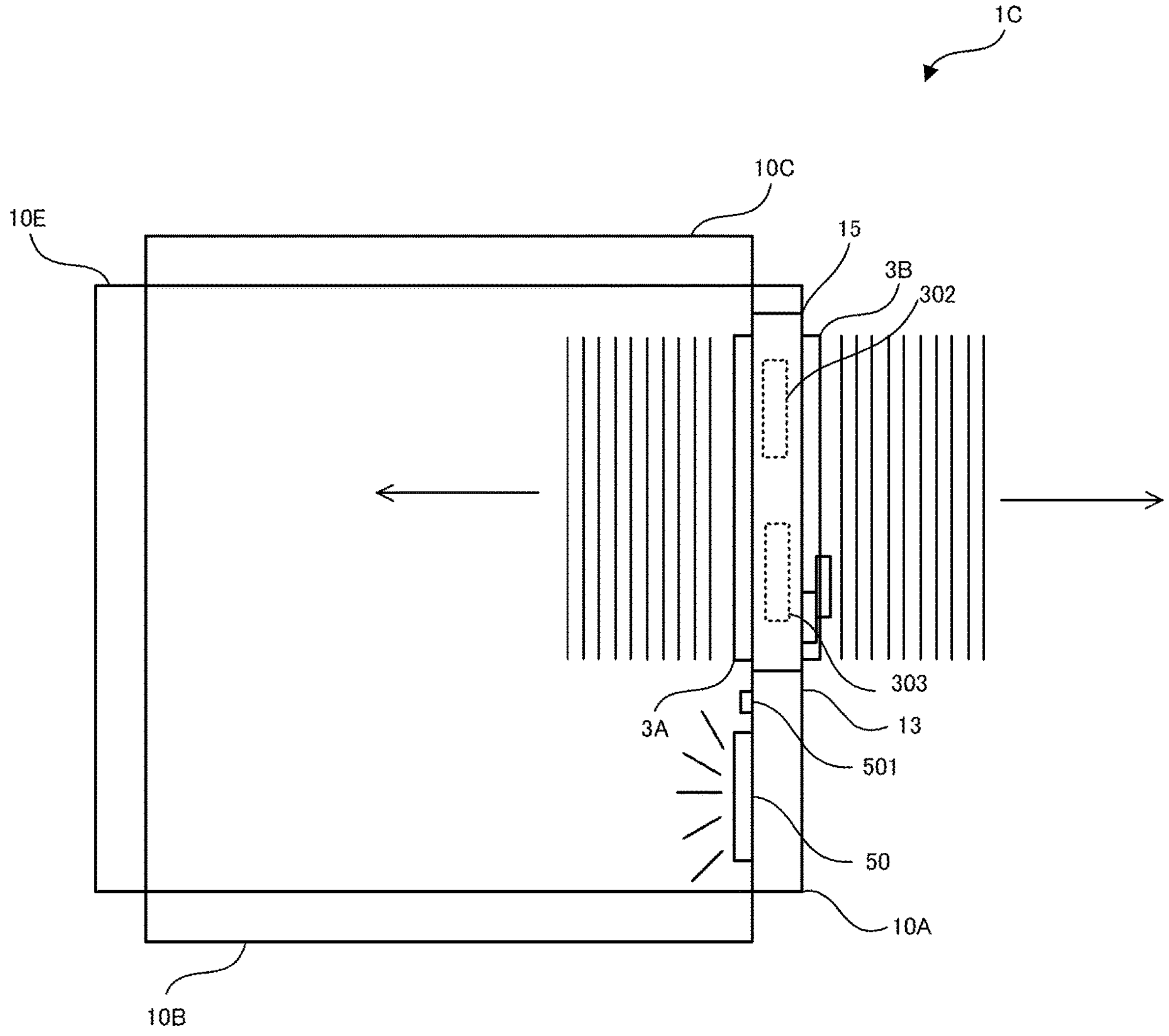
FIG. 10 is a plan view of an inside of a phone booth 1C according to a third modification, in a plan view.
Figure 11:
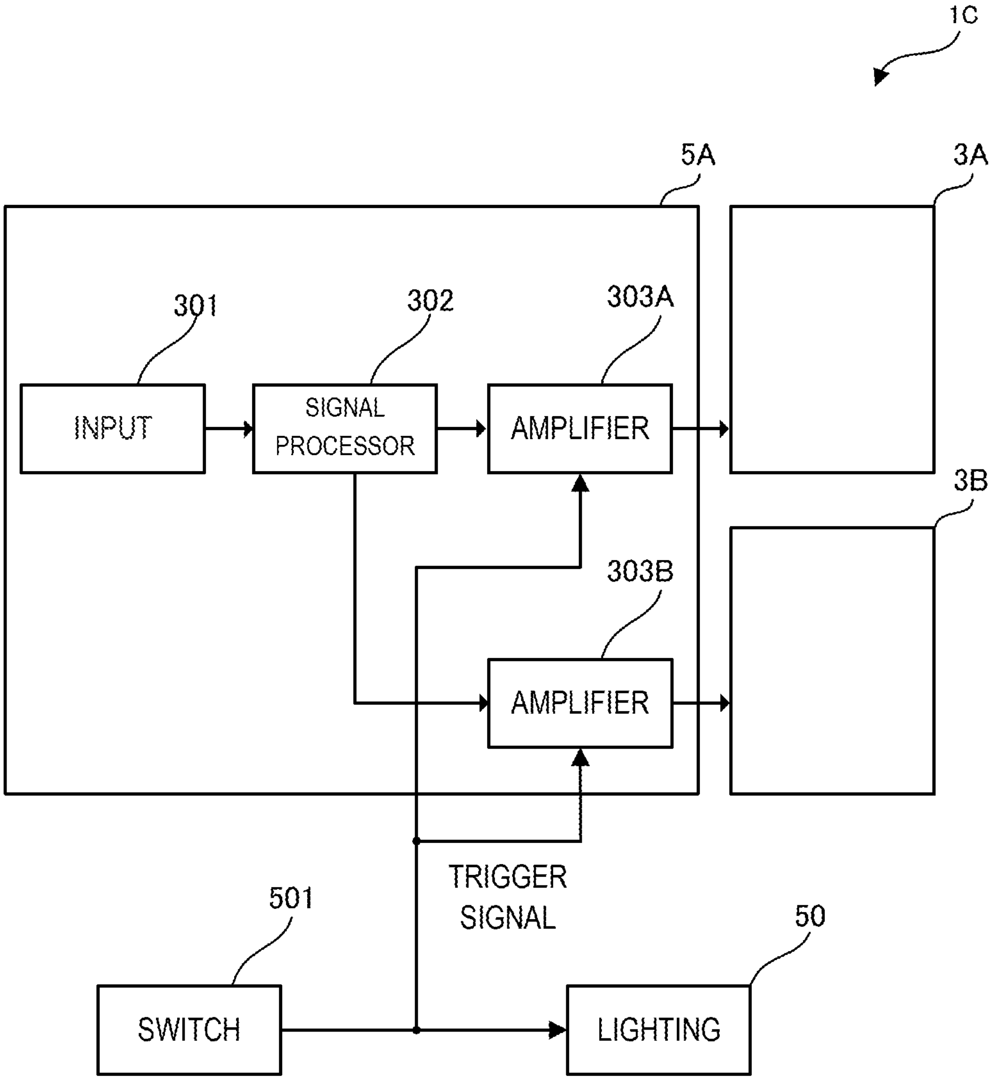
FIG. 11 is a block diagram showing a hardware configuration of the phone booth 1C according to the third modification.

FIG. 10 is a plan view of an inside of a phone booth 1C according to a third modification, in a plan view. The same reference numerals are used to refer to components common to FIG. 2, and the description will be omitted. FIG. 11 is a block diagram showing a hardware configuration of the phone booth 1C according to the third modification. The same reference numerals are used to refer to components common to FIG. 5, and the description will be omitted.

The panel 10A of the phone booth 1C according to the third modification includes two flat speakers of a flat speakers 3A and a flat speaker 3B. The flat speaker 3A is placed inside the phone booth 1C. The flat speaker 3B is placed outside the phone booth 1C.

The amplifier 303A amplifies an audio signal to be outputted to the flat speaker 3A. The amplifier 303B amplifies an audio signal to be outputted to the flat speaker 3B. The signal processor 302 performs signal processing on the audio signal to be outputted to each of the amplifier 303A and the amplifier 303B.

The flat speaker 3B is able to mask sound that leaks from the inside to the outside of the phone booth 1C, by outputting a masking sound. As a result, a person who is outside the phone booth 1C does not easily listen to a voice of a user inside of phone booth 1C, or a content sound or a voice of a user at a remote place, the content sound or the voice being listened to by the user inside.

In particular, the flat speaker 3A and the flat speaker 3B are installed in the door 13 of the phone booth 1 from which sound easily leaks and into which sound easily intrudes. Therefore, when the flat speaker 3A and the flat speaker 3B output a masking sound, the masking effect of the masking sound is able to be maximized.

However, the flat speaker 3A and the flat speaker 3B may be installed in any of the panel 10B, the panel 10C, the panel 10D, and the panel 10E. In addition, the flat speaker 3A and the flat speaker 3B may be installed at another position of the phone booth 1 from which sound easily leaks or another position (near a fan, for example) of the phone booth 1 into which sound easily intrudes. Moreover, a plurality of flat speakers do not need to be installed in the same panel. For example, the flat speaker 3A may be installed near a fan (the panel 10D being a top surface, for example), and the flat speaker 3B may be installed near the door 13 (the panel 10A). In such a case, the amplifier 303A of the flat speaker 3A may operate in conjunction with power on and off of the fan, and the amplifier 303B of the flat speaker 3B may operate in conjunction with power on and off of the lighting 50. For example, as shown in FIG. 9, in a case in which the fan 17 and the lighting 50 operate in conjunction with the on and off of the switch 501, the panel 10A and the panel 10D are previously wired to send and receive a trigger signal of the switch 501 in order to turn on and off the power of the lighting 50 and the fan 17. The amplifier 303A and the amplifier 303B, by only connecting to the wiring to send and receive the trigger signal, are able to turn on and off the power in conjunction with the on and off of the switch 501. Therefore, the panel 10A and the panel 10D according to the present embodiment do not impair the advantage of the phone booth that is able to be easily installed, disassembled, relocated, or the like.

It is to be noted that the flat speaker 3A and flat speaker 3B are not required to be configured to output a masking sound. For example, the flat speaker 3A may output the voice of a user at a remote place connected through the network, and the flat speaker 3B may output a masking sound. In such a case, a user of the phone booth 1C does not need to care about sound leakage of conversation with the user at a remote place.

Figure 12:
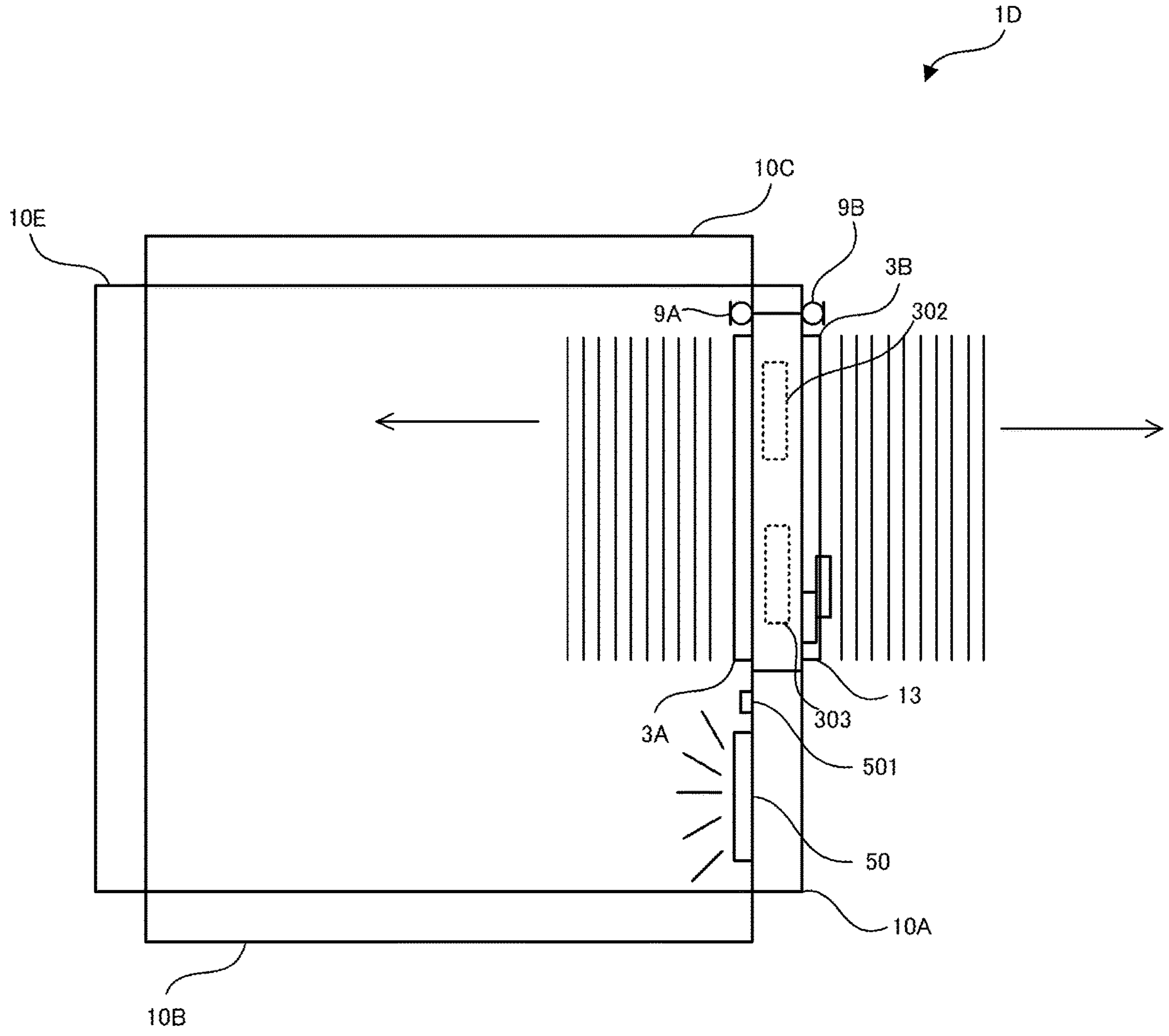
FIG. 12 is a plan view of an inside of a phone booth 1D according to a fourth modification, in a plan view.
Figure 13:
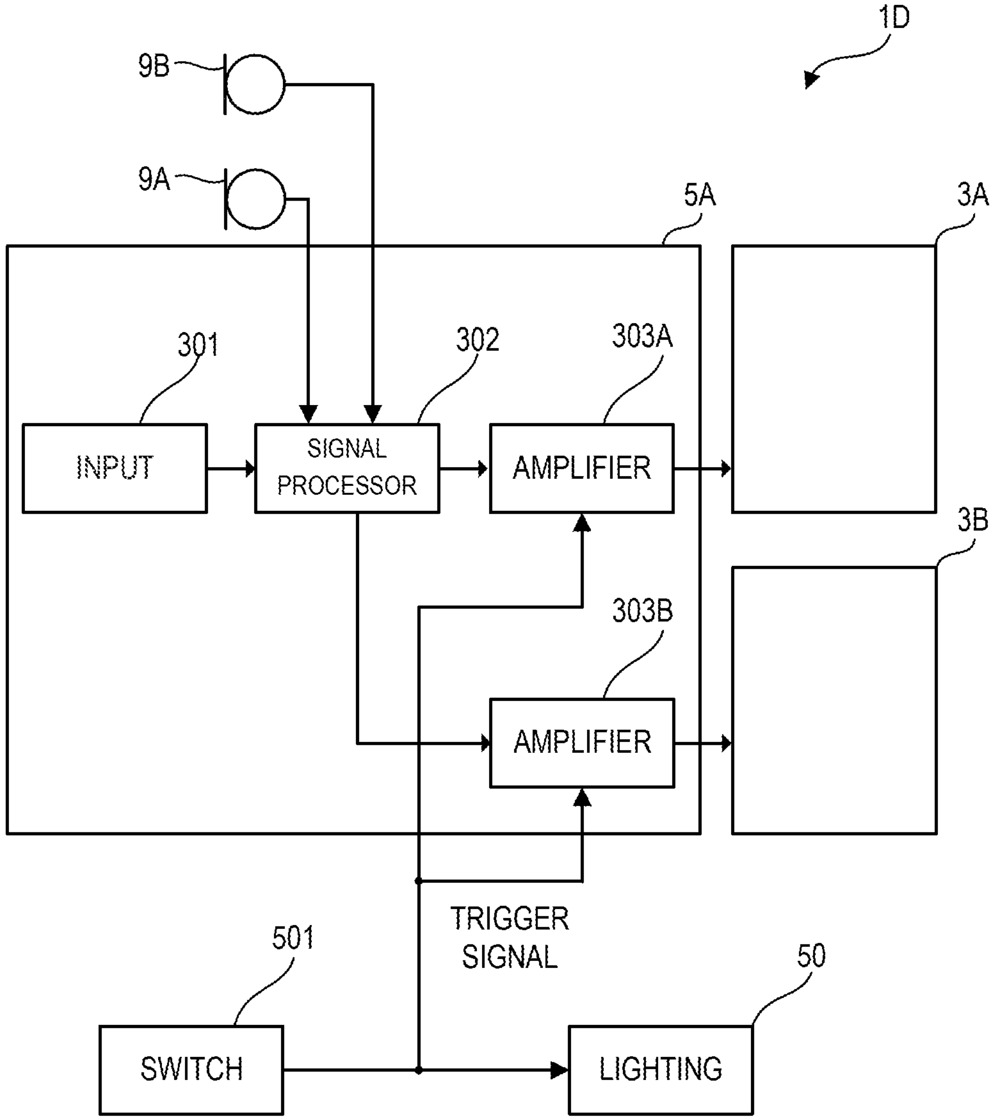
FIG. 13 is a block diagram showing a hardware configuration of the phone booth 1D according to the fourth modification.

Subsequently, FIG. 12 is a plan view of an inside of a phone booth 1D according to a fourth modification, in a plan view. The same reference numerals are used to refer to components common to FIG. 10, and the description will be omitted. FIG. 13 is a block diagram showing a hardware configuration of the phone booth 1D according to the fourth modification. The same reference numerals are used to refer to components common to FIG. 11, and the description will be omitted.

The panel 10A of the phone booth 1D according to the fourth modification includes two more microphones of a microphone 9A and a microphone 9B. The microphone 9A is placed inside the phone booth 1C. The microphone 9B is placed outside the phone booth 1C. The microphone 9A collects sound inside the phone booth 1C. In short, the microphone 9A is able to collect sound that leaks from the inside to the outside of the phone booth 1C. The microphone 9B collects sound outside the phone booth 1C. In short, the microphone 9B is able to collect sound that intrudes from the outside to the inside of the phone booth 1C.

As shown in FIG. 13, the signal processor 302 receives an audio signal obtained by the microphone 9A and the microphone 9B. The signal processor 302 performs signal processing on an audio signal to be outputted to each of the amplifier 303A and the amplifier 303B, based on the audio signal obtained by the microphone 9A and the microphone 9B. In such a case, the signal processor 302 is an example of the controller that controls the output of a directional speaker based on an audio signal of the sound collected by the microphone.

For example, the signal processor 302 adjusts a level of the audio signal to be outputted to each of the amplifier 303A and the amplifier 303B, based on a level of the audio signal obtained by the microphone 9A and the microphone 9B.

Specifically, in a case in which the level of the audio signal obtained by the microphone 9A exceeds a predetermined threshold value, and the level of the audio signal obtained by the microphone 9B is less than or equal to a predetermined threshold value, the signal processor 302 decreases (or stops an output) a level of an output of an audio signal to the flat speaker 3A, and increases the level of the audio signal to be outputted to the flat speaker 3B. As a result, even when the outside of the phone booth 1C is quiet, it is difficult for a person outside the phone booth 1C to listen to the voice of a user who is inside the phone booth 1C, or the like. On the other hand, when the outside of the phone booth 1C is quiet, the level of sound that intrudes from the outside to the inside of the phone booth 1C is low, and a masking sound does not need to be outputted. Therefore, the signal processor 302 decreases (or stops the output) the level of the output of the audio signal to the flat speaker 3A.

On the other hand, in a case in which the level of the audio signal obtained by the microphone 9B exceeds a predetermined threshold value, and the level of the audio signal obtained by the microphone 9A is less than or equal to a predetermined threshold value, the signal processor 302 decreases (or stops an output) a level of an output of an audio signal to the flat speaker 3B, and increases the level of the audio signal to be outputted to the flat speaker 3A.

In addition, in a case in which the level of the audio signal obtained by the microphone 9A exceeds a predetermined threshold value, and the level of the audio signal obtained by the microphone 9B exceeds a predetermined threshold value, the signal processor 302 may decrease (or stop the output) the level of the output of the audio signal of the flat speaker 3A and the flat speaker 3B. In a case in which the outside of the phone booth 1C is noisy, it is difficult for a person who is outside the phone booth 1C to listen to sound that leaks from the inside to the outside of the phone booth 1C. Therefore, it is not necessary to output a masking sound toward the outside of the phone booth 1C. In addition, in a case in which a level of sound generated inside the phone booth 1C is high, it is not necessary to mask the sound that intrudes from the outside to the inside of the phone booth 1C, and it is also not necessary to output a masking sound toward the inside of the phone booth 1C. Therefore, the signal processor 302 decreases (or stops the output) the level of the output of the audio signal to the flat speaker 3A and the flat speaker 3B. As a result, the signal processor 302 is able to reduce unnecessary power consumption.

In addition, in a case in which the level of the audio signal obtained by the microphone 9A is less than or equal to a predetermined threshold value, and the level of the audio signal obtained by the microphone 9B is less than or equal to a predetermined threshold value, the signal processor 302 increases the level of the audio signal to be outputted to the flat speaker 3A and the flat speaker 3B.

It is to be noted that the signal processor 302 preferably adjusts the level of the audio signal to be outputted to the flat speaker 3A and the flat speaker 3B, to a minimum necessary volume by which the effect of the masking sound is able to be produced.

Moreover, the signal processor 302 may perform fade-in processing when the masking sound starts to be outputted and may perform fade-out processing when the masking sound stops. As a result, the signal processor 302 is able to make the masking sound more unnoticeable.

The signal processor 302 may obtain a correlation between audio signal obtained by the microphone 9A and the microphone 9B. In a case in which the correlation between the audio signals obtained by the microphone 9A and the microphone 9B exceeds a predetermined threshold value, the microphone 9A and the microphone 9B are determined to obtain sound with the same component. The signal processor 302, in the case in which the correlation between the audio signals obtained by the microphone 9A and the microphone 9B exceeds a predetermined threshold, determines that sound that intrudes from the inside to the outside or from the outside to the inside has been detected. Then, the signal processor 302 determines whether the sound leaks from the inside to the outside or whether the sound intrudes from the outside to the inside, based on timing showing the peak of the correlation and volume difference between the audio signals obtained by the microphone 9A and the microphone 9B. For example, the signal processor 302, in a case in which reaching timing of the audio signal of the microphone 9A corresponding to the peak of the correlation is delayed, and the volume is low, determines that the sound intrudes from the outside to the inside, and increases the level of the audio signal to be outputted to the flat speaker 3A. The signal processor 302, in a case in which reaching timing of the audio signal of the microphone 9B corresponding to the peak of the correlation is delayed, and the volume is low, determines that the sound leaks from the inside to the outside, and increases the level of the audio signal to be outputted to the flat speaker 3B.

In addition, the signal processor 302 may adjust frequency characteristics of the audio signal to be outputted to the flat speaker 3A and the flat speaker 3B. For example, the signal processor 302 may perform band-pass filter processing to pass an audio signal in the same frequency band (a band of about 300 to 6 kHz of sound, for example) as the frequency of the correlation component that exceeds a predetermined threshold value. As a result, the signal processor 302 is able to optimally mask a component of a leaking sound or an intruding sound.

In addition, the signal processor 302 may perform low-pass filter processing to cut a band equal to or higher than a predetermined frequency (5 kHz, for example). The localization of the sound is dependent on the frequency characteristics of 5 kHz or higher. Therefore, the signal processor 302, by performing the low-pass filter processing to cut the band equal to or higher than a predetermined frequency (5 kHz, for example), is able to reduce the sense of localization of the flat speaker 3, and is able to output a more natural masking sound.

It is to be noted that, in the example of FIG. 12 as well, the flat speaker 3A and the flat speaker 3B may be installed in any of the panel 10B, the panel 10C, the panel 10D, and the panel 10E. In addition, the flat speaker 3A and the flat speaker 3B may be installed at another position of the phone booth 1 from which sound easily leaks or another position (near a fan, for example) of the phone booth 1 into which sound easily intrudes.

Figure 14:
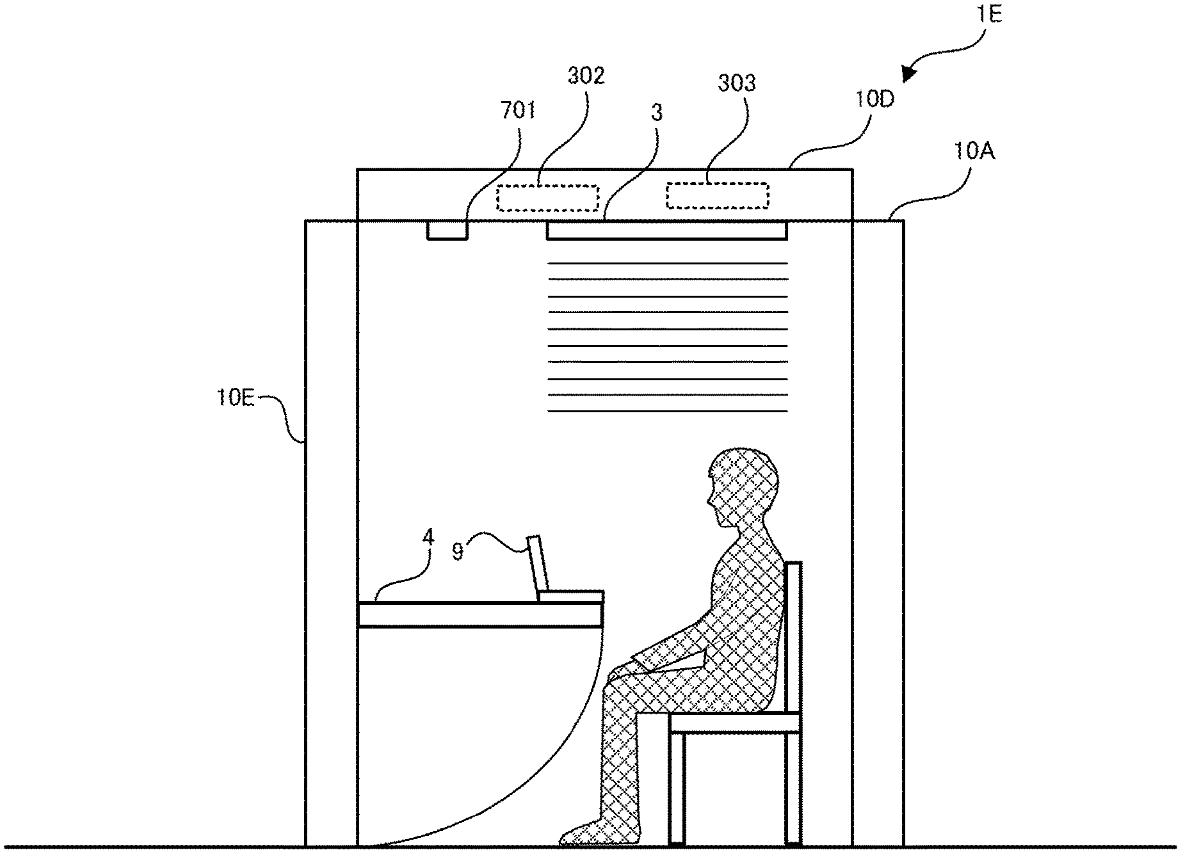
FIG. 14 is an elevational view of an inside of a phone booth 1E according to a fifth modification, in an elevation view.
Figure 15:
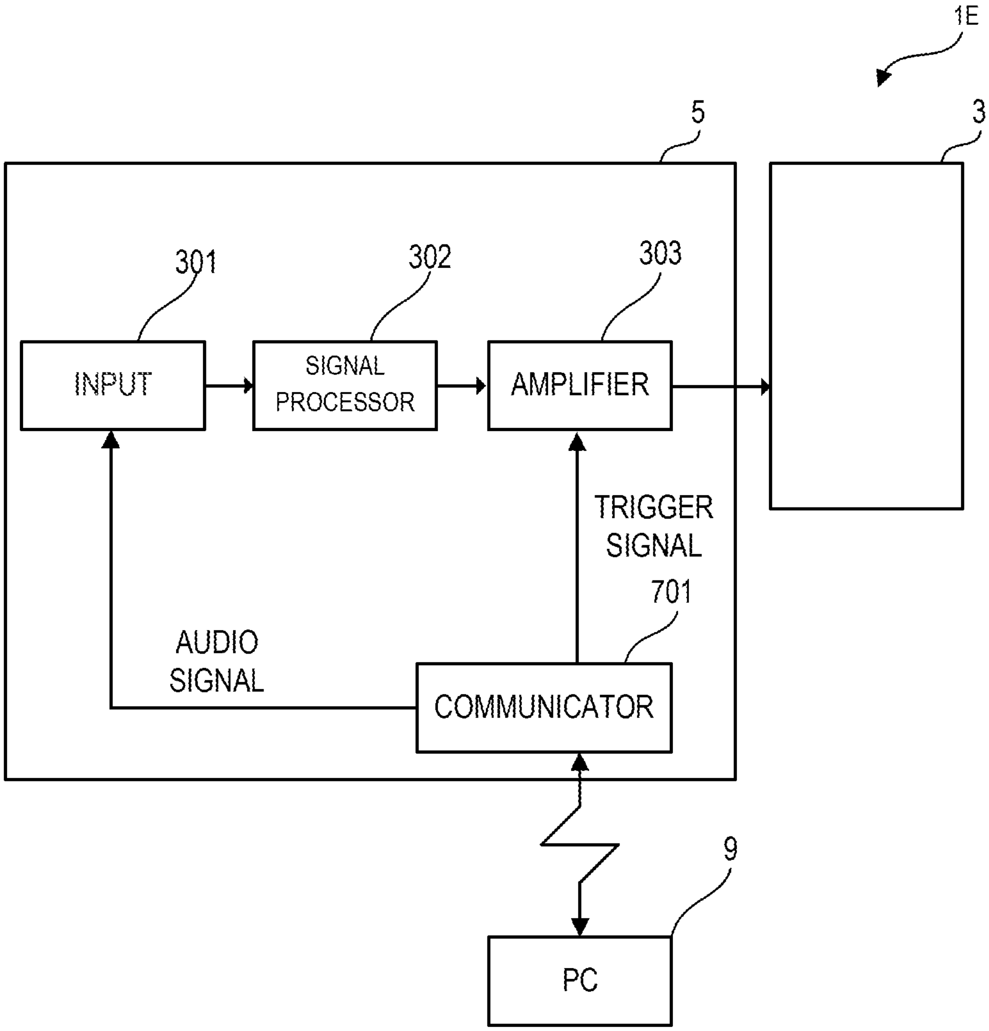
FIG. 15 is a block diagram showing a hardware configuration of the phone booth 1E according to the fifth modification.

Subsequently, FIG. 14 is an elevational view of an inside of a phone booth 1E according to a fifth modification, in an elevation view. FIG. 15 is a block diagram showing a hardware configuration of the phone booth 1E according to the fifth modification.

The panel 10D of the phone booth 1E includes a communicator 701. In addition, in this example, the flat speaker 3 is placed in the panel 10D. The communicator 701 has a communication function such as Bluetooth (registered trademark) and Wi-Fi (registered trademark).

A user of the phone booth 1E pulls out a table 4 and uses a PC 9. The PC 9 is connected to the communicator 701 through the communication function such as Bluetooth (registered trademark) and Wi-Fi (registered trademark). The PC 9 sends an audio signal to the communicator 701.

The communicator 701, when being connected to the PC 9, outputs an ON signal as a trigger signal, to the amplifier 303. The communicator 701, when releasing connection to the PC 9, outputs an OFF signal to the amplifier 303. The amplifier 303 turns on and off the power according to a trigger signal.

The communicator 701 receives an audio signal from the PC 9. The communicator 701 inputs a received audio signal to the input 301. Accordingly, the flat speaker 3 is able to output the audio signal received from PC 9.

The user of the phone booth 1E can listen to a content sound reproduced by the PC 9, from the flat speaker 3. The user of the phone booth 1E connects an information processing apparatus at a remote place through a network by the PC 9, and can listen to a voice of a user at the remote place, from the flat speaker 3.

Figure 16:
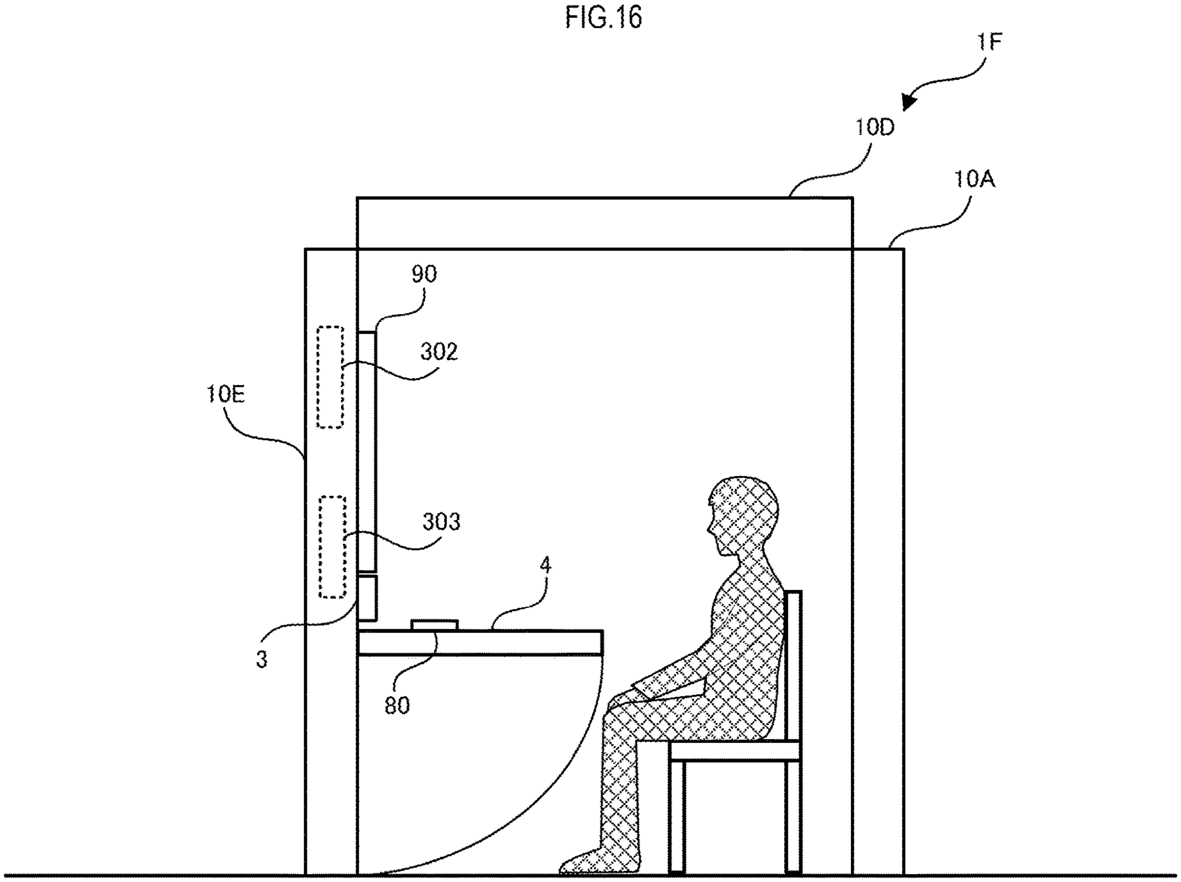
FIG. 16 is an elevational view of an inside of a phone booth 1F according to a sixth modification, in an elevation view.
Figure 17:
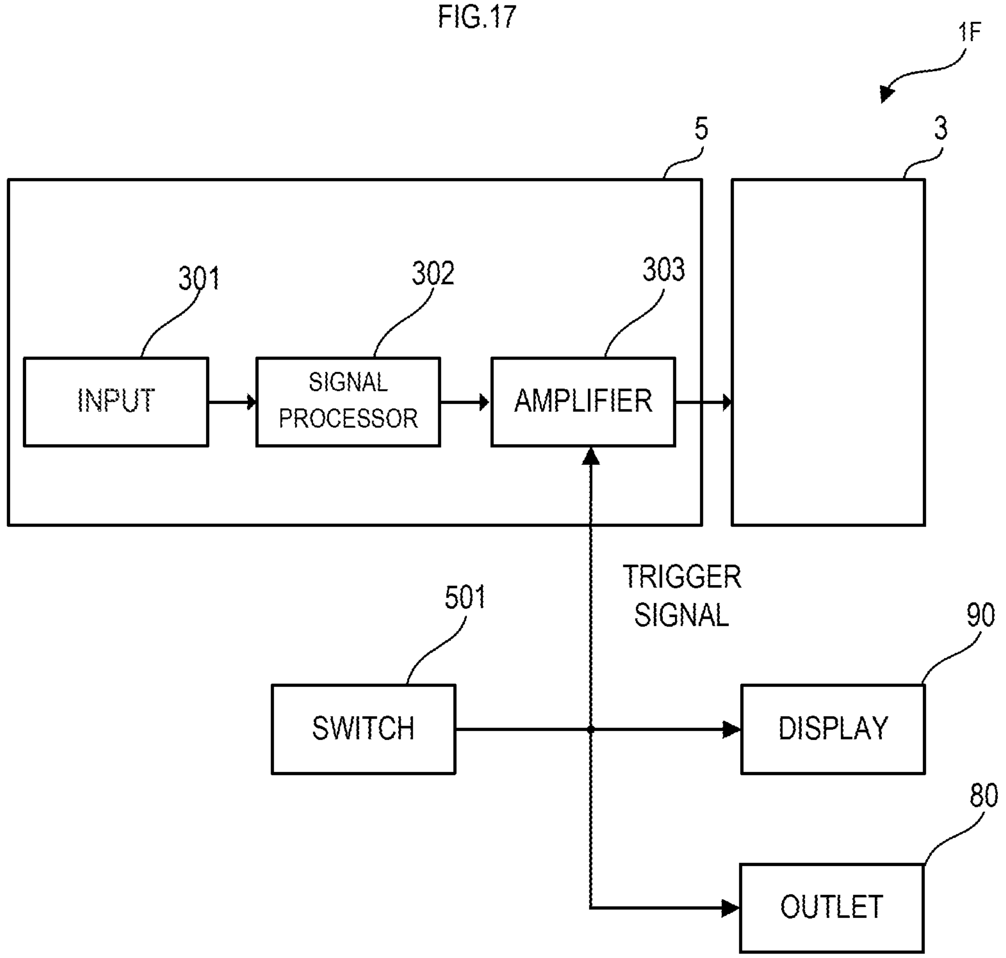
FIG. 17 is a block diagram showing a hardware configuration of the phone booth 1F according to the sixth modification.

FIG. 16 is an elevational view of an inside of a phone booth 1F according to a sixth modification, in an elevation view. FIG. 17 is a block diagram showing a hardware configuration of the phone booth 1F according to the sixth modification.

The panel 10E includes a display 90. The table 4 of this example has an electric socket (an outlet) 80. The flat speaker 3 is placed below the display 90 in the panel 10E. A user faces the display 90 and the flat speaker 3 by sitting down toward the panel 10E.

When the user turns on the switch 501, the switch 501 outputs an ON signal as a trigger signal, to the outlet 80, the display 90, and the amplifier 303. Each of the outlet 80, the display 90, and the amplifier 303 is powered on according to the trigger signal. When the user turns off the switch 501, the switch 501 outputs an OFF signal as a trigger signal, to the outlet 80, the display 90, and the amplifier 303. Each of the outlet 80, the display 90, and the amplifier 303 is powered off according to the trigger signal.

Accordingly, the outlet 80, the display 90, and the amplifier 303 are powered on and off in conjunction with each other. In the sixth modification as well, the flat speaker 3 and the electrical component are collected in the one panel 10E, and powered on and off in conjunction with each other. Therefore, a worker who builds a phone booth does not need to wire the electrical component over a plurality of panels. Therefore, the phone booth 1F according to the sixth modification does not impair the advantage of the phone booth that is able to be easily installed, disassembled, relocated, or the like.

It is to be noted that the flat speaker may be provided above or on the left and right of the display. In a case in which the flat speaker is provided on the left and right of the display, the left and right flat speakers may respectively output an audio signal of a stereo L channel and a stereo R channel. In addition, the flat speaker may be provided on the top of the table.

Moreover, the user, by using the PC 9 shown in FIG. 14 and FIG. 15, may display a video on the display 90, and may listen to a voice of a user at a remote place, from the flat speaker 3. In such a case, the panel 10E may include the communicator 701 shown in FIG. 14 and FIG. 15, and the display 90 may receive an audio signal from the PC 9 and may input a received audio signal into the input 301.

It is to be noted that, in the example shown in FIG. 14 and FIG. 16 as well, the flat speaker 3 may be installed in any of the panel 10A, the panel 10B, the panel 10C, or the panel 10E. In addition, the flat speaker 3 may be installed at another position of the phone booth 1 from which sound easily leaks or another position (near the door 13, for example) of the phone booth 1 into which sound easily intrudes.

Figure 18:
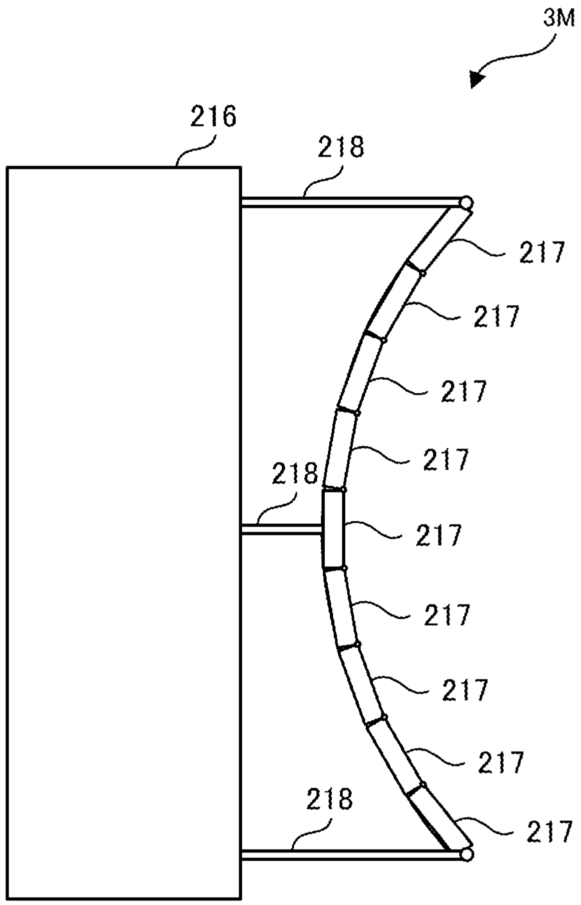
FIG. 18 is a cross-sectional view showing an example of a configuration of a flat speaker 3M divided into a plurality of units.

The flat speaker 3 may be divided into a plurality of units. FIG. 18 is a cross-sectional view showing an example of a configuration of a flat speaker 3M divided into a plurality of units.

The flat speaker 3M includes a tilt control mechanism 216, a plurality of flat speaker units 217, and a plurality of support plates 218 protruding from the tilt control mechanism 216. The flat speaker 3M includes a structure in which the plurality of flat speaker units 217 with a narrow strip shape are connected in a width direction. Each of the plurality of flat speaker units 217 is relatively rotatable to an adjacent flat speaker unit 217. The flat speaker units 217 located at a first end, a second end, and a center are supported by the support plates 218.

The tilt control mechanism 216 incorporates a driver of a motor or the like, and controls a protruding length of the plurality of support plates 218. For example, in the example of FIG. 18, the tilt control mechanism 216 causes the support plates 218 at the first end and the second end to protrude long, which shortens the protruding length of the support plate 218 at the center. As a result, a position and tilt of each sound emitting surface of the plurality of flat speaker units 217 vary, and the flat speaker 3M as a whole configures a concave-shaped sound emitting surface with a predetermined radius of curvature. In such a case, the flat speaker 3M is able to form such a wavefront to be focused on a specific position. Therefore, the flat speaker 3M is able to efficiently output sound to the specific position (the head of a user, for example). In addition, the tilt control mechanism 216 is also able to cause the support plate 218 at the first end and the second end to protrude short, which lengthens the protruding length of the support plate 218 at the center. As a result, the flat speaker 3M as a whole configures a convex-shaped sound emitting surface with a predetermined radius of curvature. In such a case, the flat speaker 3M is able to output sound to an area larger than an area of the flat speaker 3M.

Figure 19:
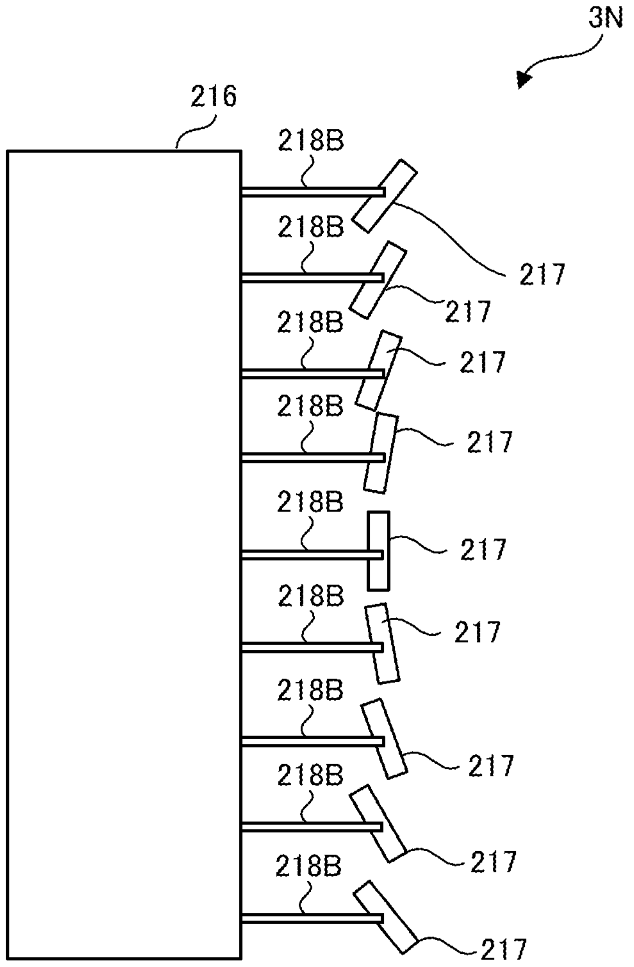
FIG. 19 is a cross-sectional view showing an example of a configuration of a flat speaker 3N divided into a plurality of units.

FIG. 19 is a cross-sectional view showing an example of a configuration of a flat speaker 3N divided into a plurality of units. In the example of FIG. 19, the flat speaker 3N includes a supporter 218B to be connected to each of the plurality of flat speaker units 217.

The tilt control mechanism 216 rotates each of the plurality of flat speaker units 217 through a plurality of supporters 218B. For example, in the example of FIG. 19, the tilt control mechanism 216 tilts the flat speaker units 217 toward the center, from the flat speaker unit 217 at the center to the first end and the second end. As a result, the flat speaker 3N as a whole configures a concave-shaped sound emitting surface with a predetermined radius of curvature. In such a case, the flat speaker 3N is able to form such a wavefront to be focused on a specific position. Therefore, the flat speaker 3N is able to efficiently output sound to the specific position (the head of a user, for example). In addition, the tilt control mechanism 216 tilts the flat speaker units 217 toward the outside, from the flat speaker unit 217 at the center to the first end and the second end. As a result, the flat speaker 3N as a whole configures a convex-shaped sound emitting surface with a predetermined radius of curvature. In such a case, the flat speaker 3N is able to output sound to an area larger than an area of the flat speaker 3N.

In addition, the tilt control mechanism 216 may tilt all the flat speaker units 217 at the same angle. In such a case, the flat speaker 3N is able to change only a direction of the plane wave. As a result, the flat speaker 3N is able to direct the plane wave in any direction. For example, the flat speaker 3N, even in a case of being attached to the panel 10E, is also able to output a plane wave toward the panel 10C being a ceiling surface, and cause the sound reflected from the panel 10C to reach a user. In such a case, the sense of localization of the flat speaker 3 is reduced, and the user can listen to a more natural sound.

It is to be noted that the signal processor 302 may control a composite wavefront of sound wave outputted from the plurality of units by controlling sound emitting timing of the plurality of speaker units. As a result, the signal processor 302 is able to control a shape of the wavefront, and is able to control directivity. Therefore, the plurality of speaker units of the flat speaker do not need to physically form a concave or a convex, and are able to be placed on a plane.

It is to be also noted that the signal processor 302 may control the sound emission timing by delaying an audio signal of two or more channels by digital signal processing and may delay an analog audio signal to be supplied to the plurality of speaker units, by an analog circuit.

In addition, the signal processor 302 may perform processing to reduce the sense of localization of the flat speaker. For example, the signal processor 302 may convolve an audio signal with the inverse function of a previously obtained transfer function (a head-related transfer function) from the flat speaker 3 obtained in advance to the head of the user. As a result, the sense of localization of the flat speaker 3 is reduced, so that the user can listen to the sound with a more natural impression.

In addition, the signal processor 302 may perform processing to add a reverberant sound. The signal processor 302, by adding a reverberant sound, is able to reduce the sense of localization of the sound that directly reaches the user from the flat speaker.

In the present embodiment, the electrostatic flat speaker is shown as an example of a directional speaker. However, the flat speaker may be a dynamic flat speaker, for example. In addition, the directional speaker may be an array speaker obtained by arranging a plurality of dynamic speakers.

Figure 20:
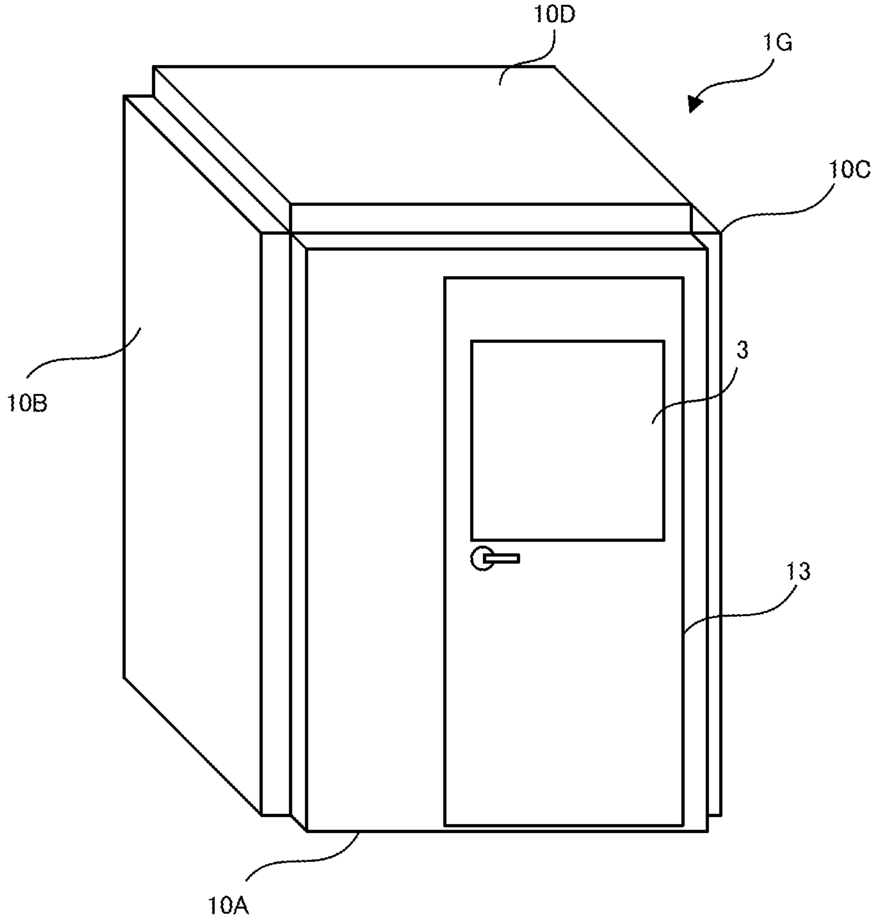
FIG. 20 is a perspective view showing a phone booth 1G according to a seventh modification.
Figure 21:
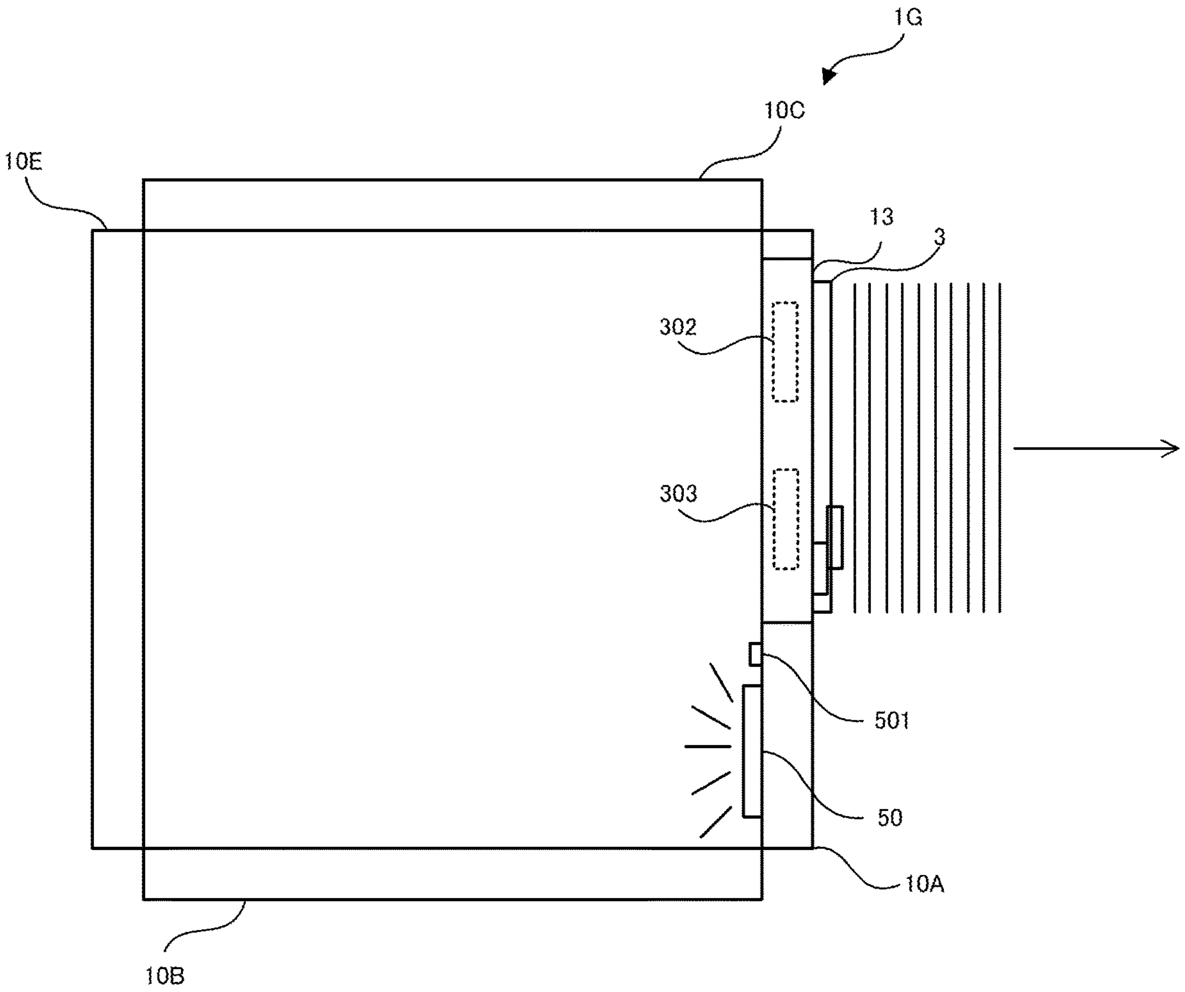
FIG. 21 is a plan view of an inside of the phone booth 1G in a plan view.

Moreover, the flat speaker may be placed only outside the phone booth, for example. FIG. 20 is a perspective view showing a phone booth 1G according to a seventh modification. FIG. 21 is a plan view of an inside of the phone booth 1G in a plan view. The flat speaker 3 according to the seventh modification is placed outside the phone booth 1G. Other configurations are the same as the configurations of the phone booth 1. The flat speaker 3 placed outside the phone booth 1G is able to mask sound that leaks from the inside to the outside of the phone booth 1G, by outputting a masking sound. As a result, a person who is outside the phone booth 1G has a difficulty listening to a voice of a user inside of phone booth 1G, or a content sound or a voice of a user at a remote place, the content sound or the voice being listened to by the user inside. In particular, the flat speaker 3 is installed in the door 13 of the phone booth 1G from which sound easily leaks. Therefore, when the flat speaker 3 outputs a masking sound, the masking effect of the masking sound is able to be maximized. As a matter of course, the flat speaker 3 may be placed at another position (near a fan, for example) from which sound easily leaks.

Figure 22:
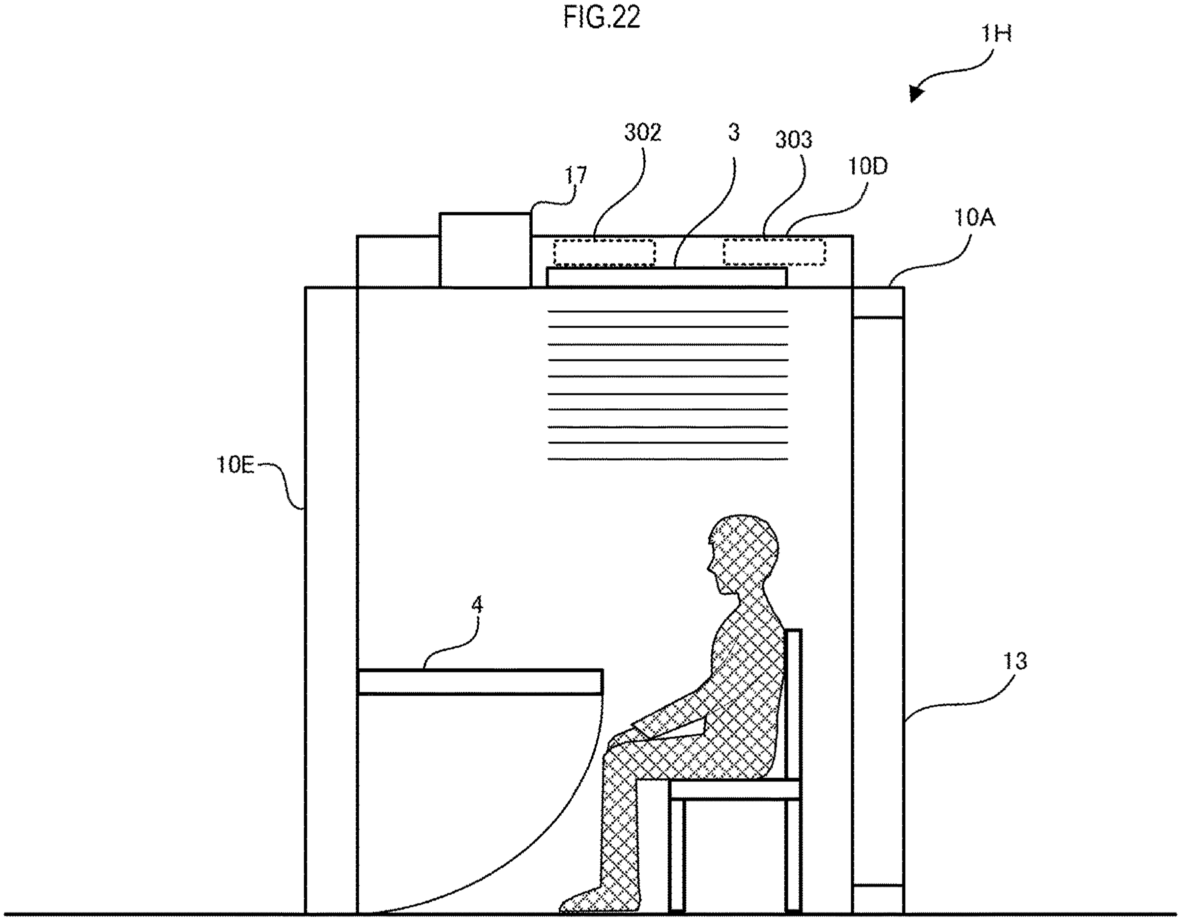
FIG. 22 is an elevational view of an inside of a phone booth 1H according to an eighth modification, in an elevation view.

The above embodiments, as one aspect in which a flat speaker is installed on a wall surface of a panel, provide an example in which the flat speaker is attached to a surface of the panel. However, the flat speaker, as another aspect in which a flat speaker is installed on a wall surface of a panel, may also be embedded into the panel. For example, FIG. 22 is an elevational view of an inside of a phone booth 1H according to an eighth modification, in an elevation view. In the phone booth 1H according to the eighth modification, the flat speaker 3 is embedded to an inside (a wall surface on the inside of the phone booth 1H) of the panel 10D being a top surface. In such a case as well, the sound emitting surface of the flat speaker 3 is directed to the inside of the phone booth 1H. It is to be noted that the flat speaker 3 may be embedded to an outside (a wall surface on the outside) of the panel. In such a case, the sound emitting surface of the flat speaker 3 is directed to the outside of the phone booth. In FIG. 22, the flat speaker 3, although being installed on the wall surface of the panel 10D being a top surface, as with a case of being installed in another panel, may be embedded to the inside (the wall surface on the inside) of the panel or to the outside (the wall surface on the outside) of the panel.

Figure 23:
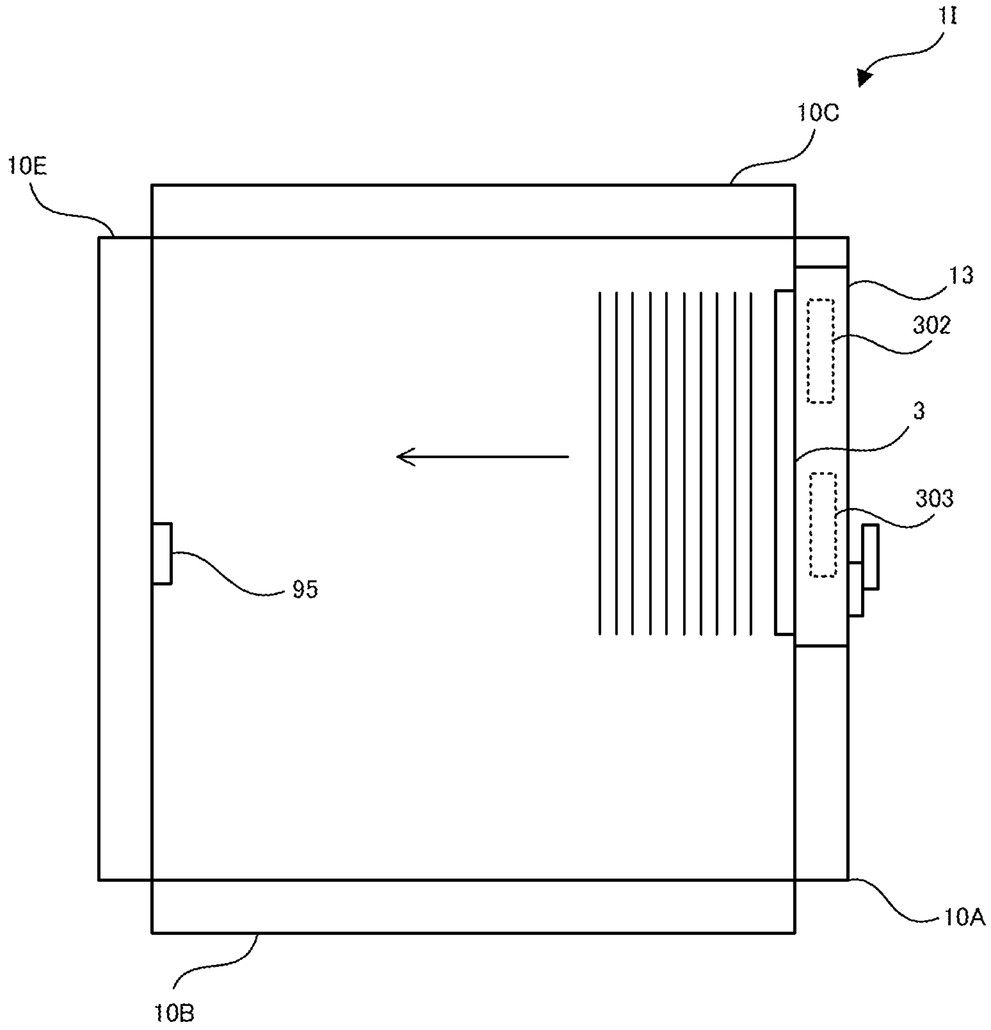
FIG. 23 is a plan view of an inside of a phone booth 1I according to a ninth modification, in a plan view.
Figure 24:
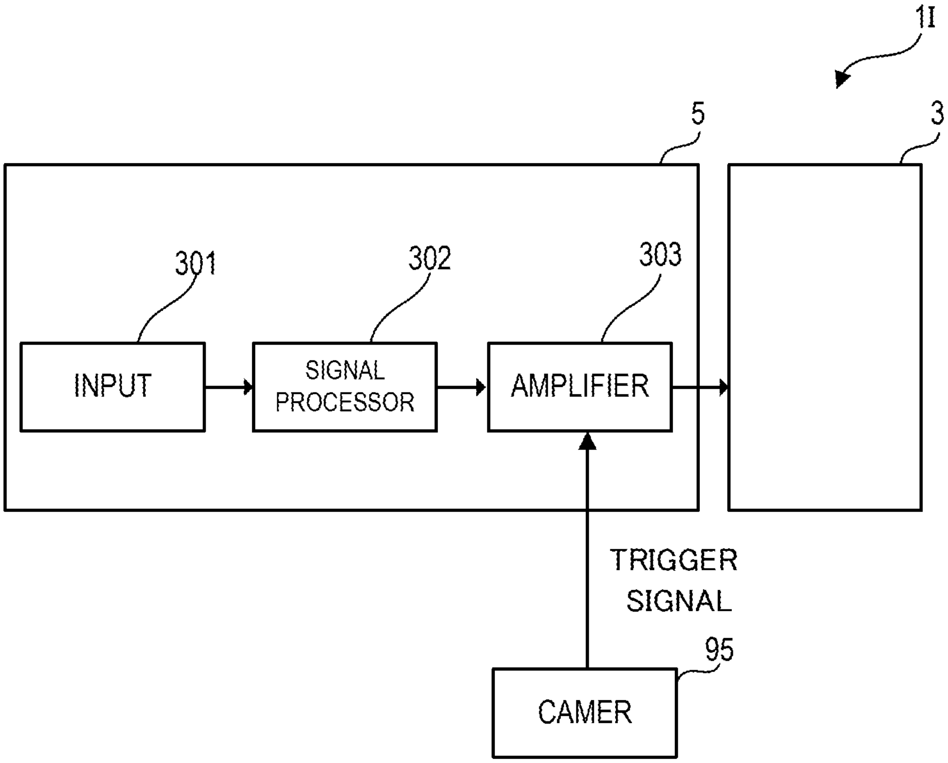
FIG. 24 is a block diagram showing a hardware configuration of the phone booth 1I according to the ninth modification.

FIG. 23 is a plan view of an inside of a phone booth 1I according to a ninth modification, in a plan view. The same reference numerals are used to refer to components common to FIG. 2, and the description will be omitted. FIG. 24 is a block diagram showing a hardware configuration of the phone booth 1I according to the ninth modification. The same reference numerals are used to refer to components common to FIG. 5, and the description will be omitted. The phone booth 1I according to the ninth modification is different in configuration from the phone booth 1 in that a trigger signal is received from camera 95 in place of the switch 501.

The camera 95 is installed in the panel 10E. The camera 95 is installed so as to capture the door 13 of the panel 10A. The camera 95 detects presence of a person who is inside the phone booth 1I, by image recognition processing. The camera 95, in a case of detecting a person inside the phone booth 1I, outputs an ON signal as a trigger signal, to the amplifier 303. The camera 95, when a predetermined time elapses after no person is detected inside the phone booth 1I, outputs an OFF signal as a trigger signal, to the amplifier 303. The amplifier 303 is powered on and off according to the trigger signal (the ON and OFF signal).

In the phone booth 1I according to the ninth modification as well, the worker does not need to apply new wiring only for the flat speaker 3. Therefore, the phone booth 1I according to the ninth modification does not impair the advantage of the phone booth that is able to be easily installed, disassembled, relocated, or the like.

Figure 25:
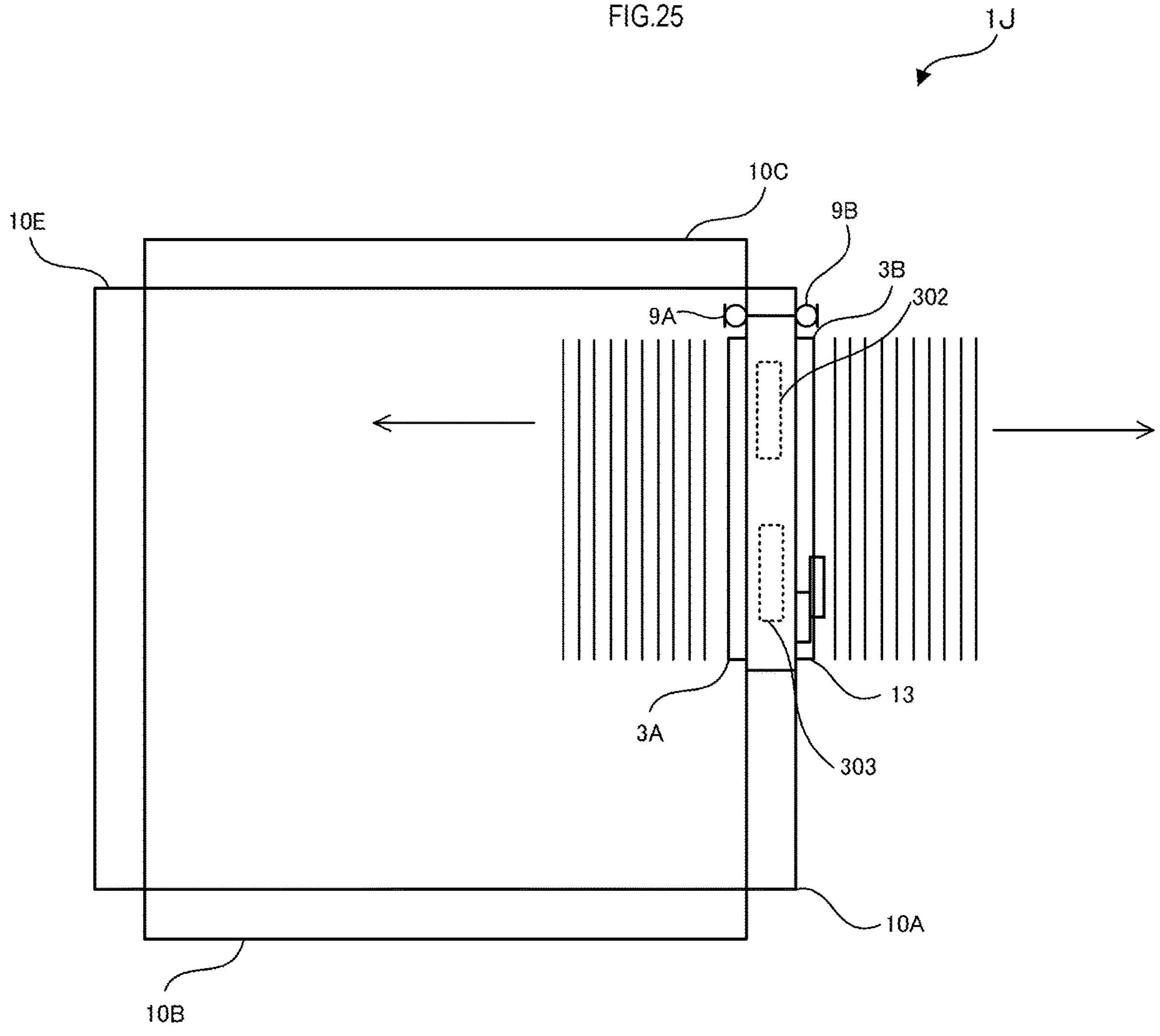
FIG. 25 is a plan view of an inside of a phone booth 1J according to a tenth modification, in a plan view.
Figure 26:
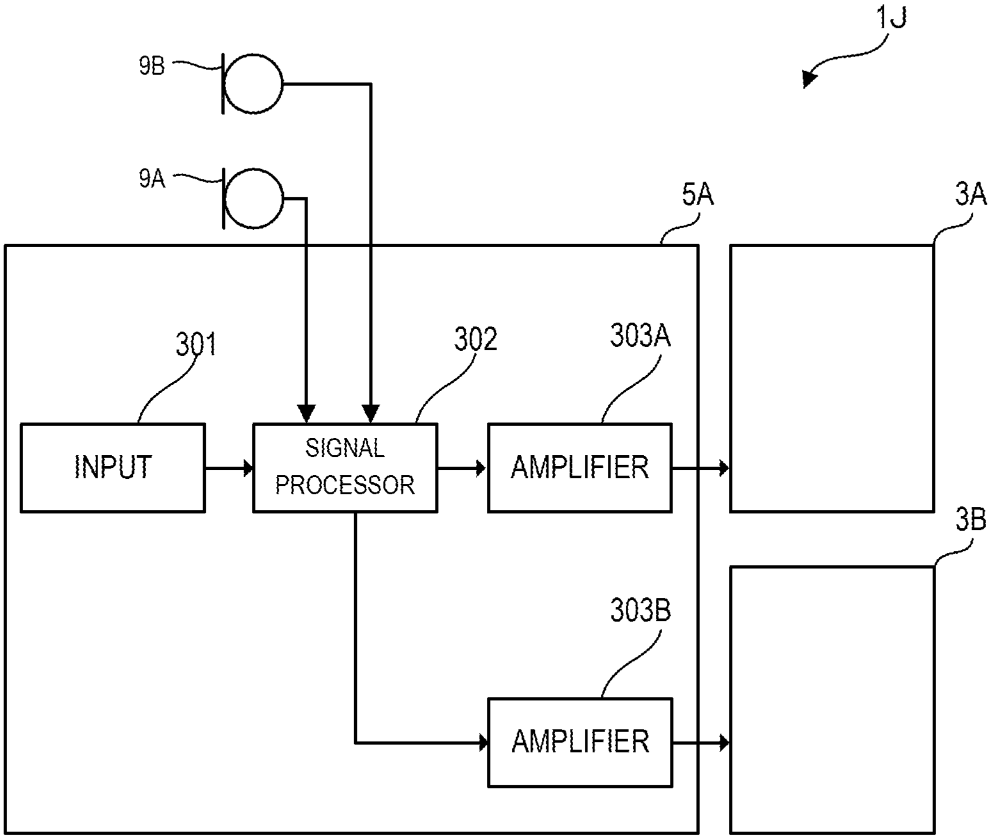
FIG. 26 is a block diagram showing a hardware configuration of the phone booth 1J according to the tenth modification.

Subsequently, FIG. 25 is a plan view of an inside of a phone booth 1J according to a tenth modification, in a plan view. The same reference numerals are used to refer to components common to FIG. 12, and the description will be omitted. FIG. 26 is a block diagram showing a hardware configuration of the phone booth 1J according to the tenth modification. The same reference numerals are used to refer to components common to FIG. 13, and the description will be omitted. The phone booth 1J according to the tenth modification is different in configuration from the phone booth 1D of FIG. 13 and FIG. 14 in that a trigger signal is not received from the switch 501 and the lighting 50.

The signal processor 302 corresponds to the controller of the present disclosure, compares a first audio signal of sound collected by a first microphone 9A and a second audio signal of sound collected by a second microphone 9B, and controls the output of the directional speaker based on a comparison result.

Specifically, the signal processor 302 causes a voice of a user according to the first audio signal of the sound collected by the microphone 9A to be outputted from the flat speaker 3A. Then, the signal processor 302 controls the level of the audio signal to be outputted to the flat speaker 3A, based on loudness of sound that intrudes from the outside to the inside or loudness of sound that leaks from the inside to the outside. More specifically, the signal processor 302 increases a volume of the voice of the user according to the first audio signal, as the loudness of the sound that intrudes from the outside to the inside is increased. In addition, the signal processor 302 increases the volume of the voice of the user according to the first audio signal, as the loudness of the sound that leaks from the inside to the outside is increased.

The sound that leaks from the inside to the outside is increased as a volume of a voice of a user in the phone booth 1J is increased. A plurality of factors increase the volume of the voice of a user.

For example, when the volume of the sound that intrudes from the outside to the inside is increased, the user has difficulty hearing the own voice and emits a loud voice.

In contrast, the signal processor 302 according to the ninth modification increases the volume of the voice of the user according to the first audio signal to be outputted from the flat speaker 3A, as the loudness of the sound that intrudes from the outside to the inside is increased. As a result, the user can more easily hear the own voice, and talks with a reduced volume of the own voice.

On the one hand, in a conversation with a remote user at a remote place, the user is conscious of conveying words to the remote user, and emits a loud voice. In addition, some users emit a loud voice not only in the conversation with the remote user but also in a normal conversation. On the other hand, the user is not able to know how much the voice of a conversation is leaking from the inside to the outside.

In contrast, the signal processor 302 according to the ninth modification increases the volume of the voice of the user according to the first audio signal, the voice being outputted from the flat speaker 3A, as the loudness of the sound that leaks from the inside to the outside is increased. As a result, the user can know how much the voice is leaking from the inside to the outside by hearing the own voice to be outputted from the flat speaker 3A. Therefore, the user talks with a reduced volume of the own voice.

In addition, the voice of the user to be outputted from the flat speaker 3A reaches a facing wall surface of the panel 10E without largely spreading out. Therefore, a possibility that the voice of the user to be outputted from the flat speaker 3A leaks outside the phone booth 1J is also low.

It is to be noted that the wall surface of the panel 10E that faces the flat speaker 3A may include a material with a high reflectivity (low degree of sound absorption). Alternatively, a highly reflective (low sound absorptive) material may be attached to the wall surface of the panel 10E. Accordingly, a voice outputted from the flat speaker 3A is reflected by the wall surface of the panel 10E. In a case in which the user of the phone booth 1J faces the panel 10E, when the voice outputted from the flat speaker 3A is reflected by the wall surface of the panel 10E, the sound of the flat speaker 3A is able to reach from the front of the user, and a more natural sense of localization is able to be achieved.

Figure 27:
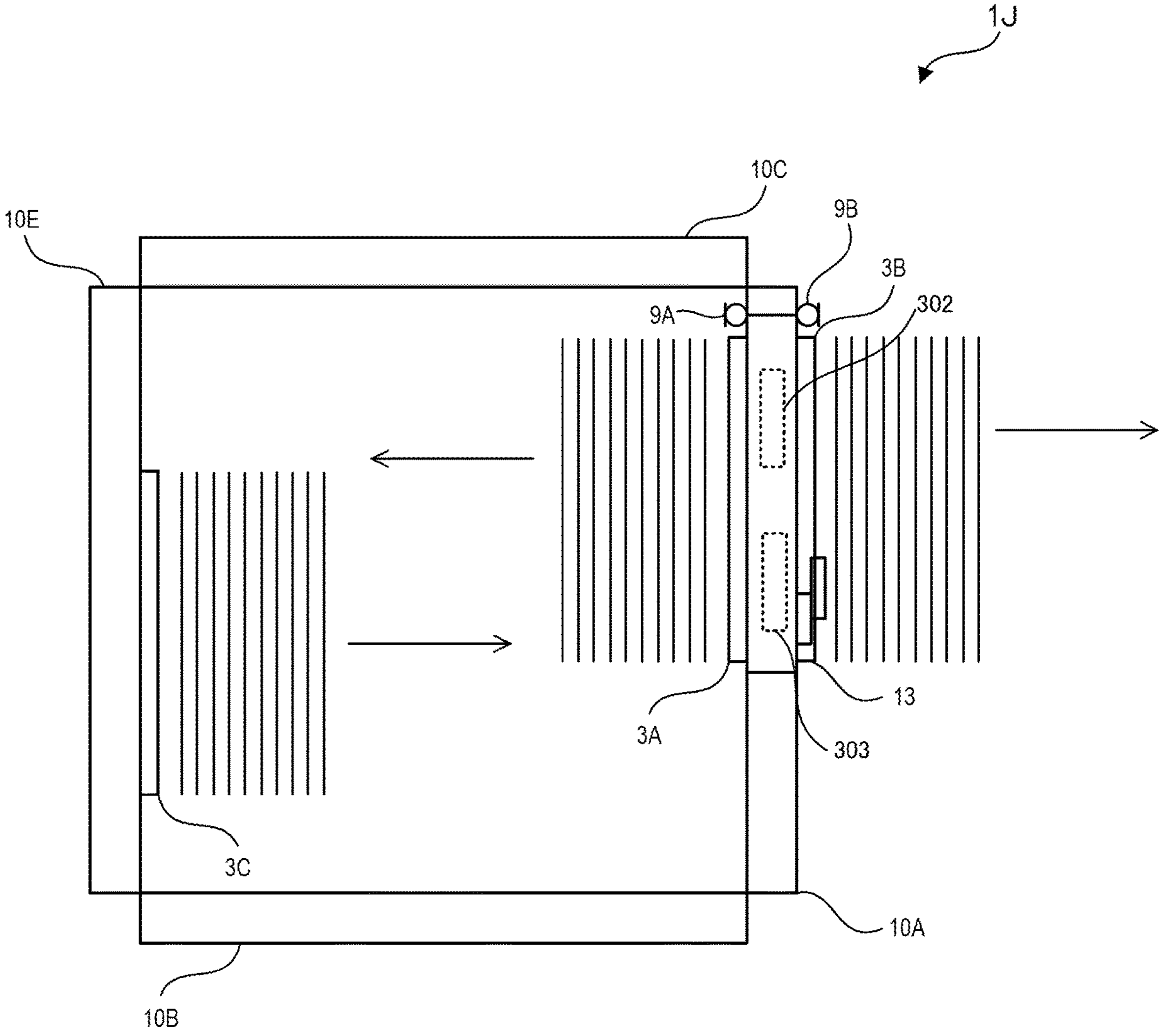
FIG. 27 is a plan view of an inside of the phone booth 1J, in the plan view, in a case in which a panel 10E includes a flat speaker 3C.

It is to be also noted that, as shown in FIG. 27, in a case in which the phone booth 1J includes a flat speaker 3C that faces the door 13 from which sound easily leaks, the flat speaker 3C preferably outputs no sound in a band (about 300 to 6 kHz band of sound, for example) from which sound easily leaks. As a result, a possibility that the voice of the user to be outputted from the flat speaker 3C leaks outside the phone booth 1J is also low.

It is to be noted that the sound to be outputted from the flat speaker 3A is not limited to the voice of a user. For example, the signal processor 302 may output a warning sound and a guidance voice such as "the sound is leaking" from the flat speaker 3A. In such a case as well, the user can know that the sound is leaking from the inside to the outside, and talks with a reduced volume of the own voice.

It is to be also noted that, as with the phone booth 1F shown in the sixth modification of FIG. 16, in a case in which the phone booth 1J includes the display, the signal processor 302 may display guidance such as "the sound is leaking" on the display. Alternatively, the phone booth 1J may change a guidance display according to the loudness of sound that leaks from the inside to the outside. For example, the signal processor 302 turns on a blue LED when the loudness of the sound that leaks from the inside to the outside is small, turns on a yellow LED when the loudness of the sound that leaks from the inside to the outside is increased, and turns on a red LED when the loudness of the sound that leaks from the inside to the outside is further increased.

In short, the signal processor 302 (the controller of the present disclosure) does not necessarily need to perform directional control, compares the first audio signal of the sound collected by the microphone 9A and the second audio signal of the sound collected by the microphone 9B, and may control display of the display based on a comparison result.

Modification of Method of Measuring Intrusion Sound and Leakage Sound

As with the phone booth 1D according to the fourth modification, the signal processor 302 may obtain a correlation between the audio signals obtained by the microphone 9A and the microphone 9B. The signal processor 302, in the case in which the correlation between the audio signals obtained by the microphone 9A and the microphone 9B exceeds a predetermined threshold, may determine that sound leaks from the inside to the outside or sound intrudes from the outside to the inside has been detected.

In addition, the signal processor 302 may obtain the correlation for each predetermined frequency band. For example, the signal processor 302 extracts a plurality of frequency bands from the audio signals of the microphone 9A and the microphone 9B, by a band pass filter. For example, the signal processor 302 extracts the plurality of frequency bands, by four 1/1 octave band filters of a 500-Hz band, a 1-kHz band, a 2-kHz band, and a 4-kHz band. Specifically, the four 1/1 octave band filters respectively pass through a frequency of 355 Hz to 710 Hz in the 500-Hz band, a frequency of 710 Hz to 1.4 kHz in the 1-kHz band, a frequency of 1.4 kHz to 2.8 kHz in the 2-kHz band, and a frequency of 2.8 kHz to 5.6 kHz in the 4-kHz band. Accordingly, the signal processor 302 extracts the four frequency bands from the audio signal.

The signal processor 302 may obtain a correlation in each of the four frequency bands, and may obtain a degree of sound intrusion or a degree of sound leakage.

In addition, the signal processor 302 may perform the following noise reduction processing.

Measurement of Background Noise

The signal processor 302 records an average value of the volume of the sound of the microphone 9A at every predetermined time (every 1 second, for example). The signal processor 302, in a case in which the average value is stable, for example, in a case in which a change in sound volume is within ±3 dB continuously at every predetermined time (every 3 seconds, for example), records the audio signal currently obtained by the microphone 9A as an audio signal of a background noise in the phone booth 1J. In addition, the signal processor 302 records frequency characteristics (first frequency characteristics) of the audio signal of the background noise in the phone booth 1J.

In addition, the signal processor 302 records an average value of the volume of the sound of the microphone 9B at every predetermined time (every 1 second, for example). The signal processor 302, in a case in which the average value is stable, for example, in a case in which a change in sound volume is within ±3 dB continuously at every predetermined time (every 3 seconds, for example), records the audio signal currently obtained by the microphone 9B as an audio signal of a background noise out of the phone booth 1J. In addition, the signal processor 302 records frequency characteristics (second frequency characteristics) of the audio signal of the background noise out of the phone booth 1J.

Measurement of Degree of Sound Intrusion

The signal processor 302, in a case in which the volume of the sound of the microphone 9A is similar to the level of the audio signal of the background noise and the user in the phone booth 1J is not talking, performs noise reduction processing on the audio signal obtained by the microphone 9A by use of the first frequency characteristics, based on spectrum subtraction, a Wiener filter, or the like, for example. The signal processor 302 obtains a correlation between the audio signal of microphone 9A on which the noise reduction processing has been performed and the audio signal of microphone 9B.

Measurement of Degree of Sound Leakage

The signal processor 302, in a case in which the volume of the sound of the microphone 9A is higher than the level of the audio signal of the background noise and the user in the phone booth 1J is talking, performs noise reduction processing on the audio signal obtained by the microphone 9B by use of the second frequency characteristics, based on the spectrum subtraction, the Wiener filter, or the like, for example. The signal processor 302 obtains a correlation between the audio signal obtained by the microphone 9A and the audio signal of microphone 9B on which the noise reduction processing has been performed.

As described above, the signal processor 302, by obtaining the correlation based on the audio signal on which the noise reduction processing has been performed, is able to more highly accurately determine whether sound leaks from the inside to the outside and whether sound intrudes from the outside to the inside.

Method of Measuring Degree of Sound Leakage Based on Word Comprehension Level The signal processor 302 may determine whether sound leaks from the inside to the outside based on a predictor of a word comprehension level.

First, the signal processor 302 extracts a plurality of frequency bands from the audio signal of the microphone 9A, by a band pass filter. For example, the signal processor 302 extracts the plurality of frequency bands, by the four 1/1 octave band filters of the 500-Hz band, the 1-kHz band, the 2-kHz band, and the 4-kHz band. Specifically, the four 1/1 octave band filters respectively pass through the frequency of 355 Hz to 710 Hz in the 500-Hz band, the frequency of 710 Hz to 1.4 kHz in the 1-kHz band, the frequency of 1.4 kHz to 2.8 kHz in the 2-kHz band, and the frequency of 2.8 kHz to 5.6 kHz in the 4-kHz band. Accordingly, the signal processor 302 extracts the four frequency bands from the audio signal.

The signal processor 302 obtains a degree of sound leakage based on the predictor of the word comprehension level, in each of the four frequency bands. Specifically, the signal processor 302, in each frequency band, obtains a difference between the volume (dB) of a background noise (a noise sound) and the volume (dB) of the audio signal currently obtained by the microphone 9B, that is, an SNR (Signal to Noise Ratio) being a sound volume ratio of a conversation sound to a background noise. The signal processor 302, by predicting a word comprehension level from the SNR and determining that sound leakage is large in a case in which a predicted word comprehension level exceeds a threshold value of the SNR on a basis of a predetermined word comprehension level, increases the voice of a user to be outputted from the flat speaker 3A, outputs a guidance sound, or displays a guidance on a display.

Figure 28:
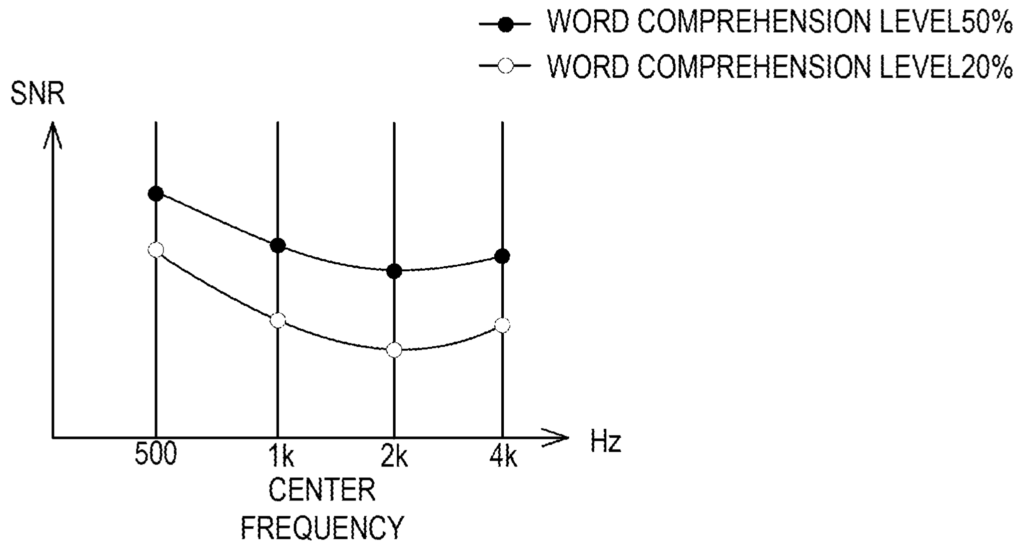
FIG. 28 is a view showing a threshold value of an SNR for each frequency band.

FIG. 28 is a view showing a threshold value of an SNR for each frequency band. The horizontal axis of a graph shown in FIG. 28 indicates a frequency (Hz), and the vertical axis indicates an SNR (dB). The threshold value of the SNR is obtained based on the word comprehension level.

A relationship between the predictor of the word comprehension level and the SNR was obtained by an experiment. The inventors of this application caused a plurality of listeners to listen to a word sound and a noise sound by the experiment. The inventors of this application caused the plurality of listeners to listen to a word sound and a noise sound on the condition that the SNR is the same, and, for each band, obtained the number of experiment trials that the listeners could comprehend the content of a word to the total number of experimental trials as a word comprehension level. The relationship between the word comprehension level and the SNR determined a prediction formula, and the threshold value of the SNR based on a predetermined word comprehension level.

The word comprehension level of 50% means that the number of experiment trials that the listeners could comprehend the content of a word to the total number of experiment trials is about 50%. The word comprehension level of 20% means that the number of experiment trials that the listeners could comprehend the content of a word to the total number of experiment trials is about 20%. With the word comprehension level of 50%, a listener is difficult to comprehend the content of a conversation, and a listener is considered not to be able to comprehend the content of a conversation at all with the word comprehension level of 20%. In other words, there is no sound leakage at all when the word comprehension level is less than 20%, and there may be a slight sound leakage when the word comprehension level is from 20% to 50%. In addition, in a case in which the word comprehension level exceeds 50%, there may be the sound leakage.

The signal processor 302, by obtaining an SNR in each octave band and determining that sound leakage occurs in a case in which a frequency band in which the word comprehension level exceeds 50% is present, increases the voice of a user to be outputted from the flat speaker 3A, outputs a guidance sound, or displays a guidance on a display.

Figure 29:
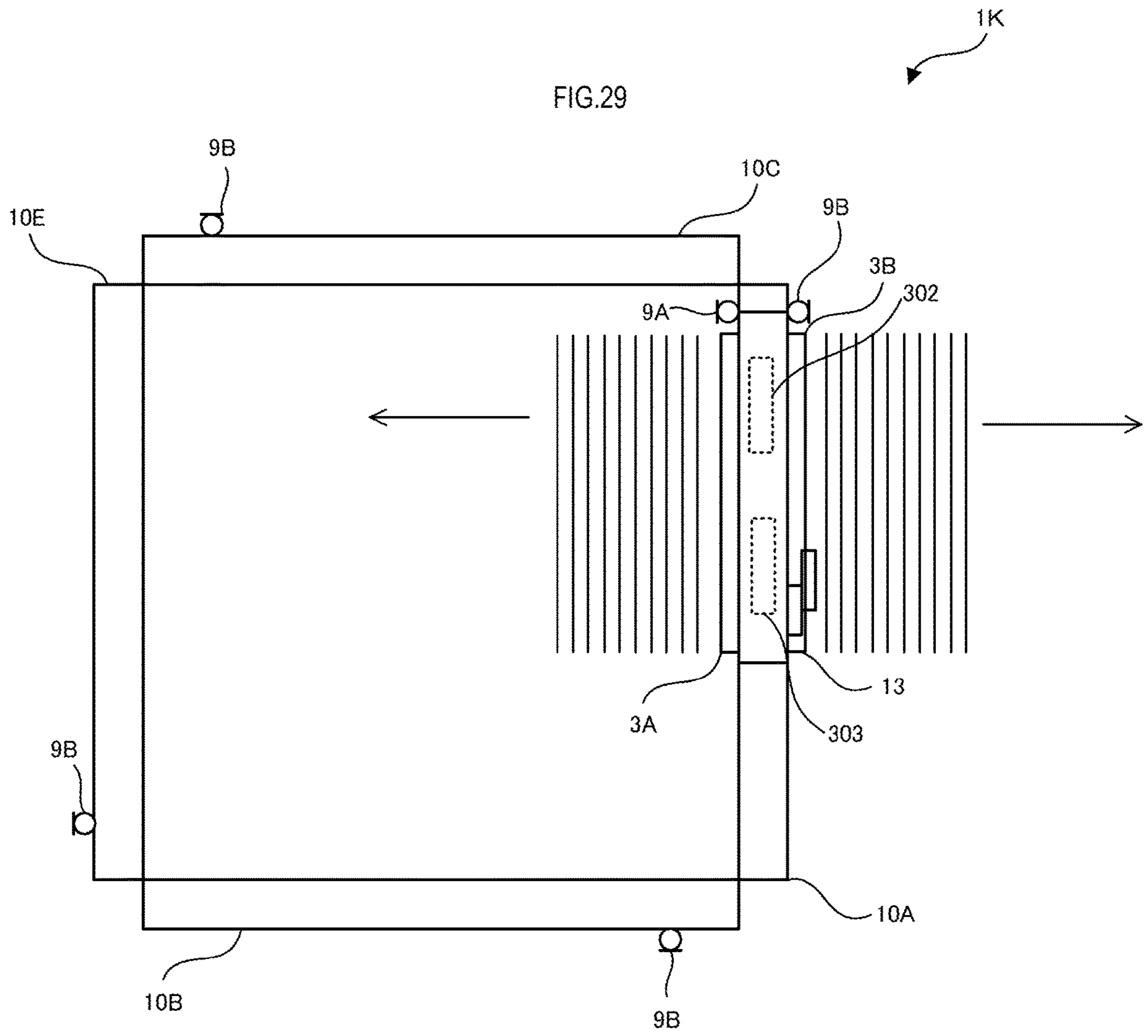
FIG. 29 is a plan view of an inside of a phone booth 1K according to an eleventh modification, in a plan view.

Subsequently, FIG. 29 is a plan view of an inside of a phone booth 1K according to an eleventh modification, in a plan view. The same reference numerals are used to refer to components common to FIG. 25, and the description will be omitted.

The phone booth 1K according to the eleventh modification includes a microphone 9B in each of a plurality of panels 10A, 10B, 10C, and 10E. The signal processor 302 receives an audio signal obtained by the microphone 9B of each of the plurality of panels 10A, 10B, 10C, and 10E.

The signal processor 302 compares the audio signal obtained by the microphone 9A with the audio signal obtained by the microphone 9B of each of the plurality of panels 10A, 10B, 10C, and 10E, and controls the output of the directional speaker based on a comparison result. Alternatively, the signal processor 302 compares the audio signal obtained by the microphone 9A with the audio signal obtained by the microphone 9B of each of the plurality of panels 10A, 10B, 10C, and 10E, and controls the display of the display based on the comparison result.

As a result, the signal processor 302 is able to determine from which direction of all circumferential directions of the phone booth 1K sound intrudes and in which direction of all circumferential directions of the phone booth 1K sound leaks.

In addition, the signal processor 302 may obtain autocorrelation of the audio signals obtained by the microphone 9B of each of the plurality of panels 10A, 10B, 10C, and 10E. The signal processor 302 determines whether or not each panel is installed at a position near the wall surface of the room, based on the autocorrelation. For example, the signal processor 302, in a case in which a time difference between an initial peak of the autocorrelation and a secondary peak of the autocorrelation is within a predetermined time, and a level difference of the secondary peak to the initial peak is within a predetermined level, determines that the panel in which the microphone 9B is installed is installed at a position near the wall surface of the room. The signal processor 302 does not use a signal of the microphone 9B determined to be installed at the position near the wall surface of the room.

As a result, the signal processor 302 is able to determine from which direction of all circumferential directions of the phone booth 1K sound intrudes and in which direction of all circumferential directions of the phone booth 1K sound leaks, without performing unnecessary processing.

Figure 30:
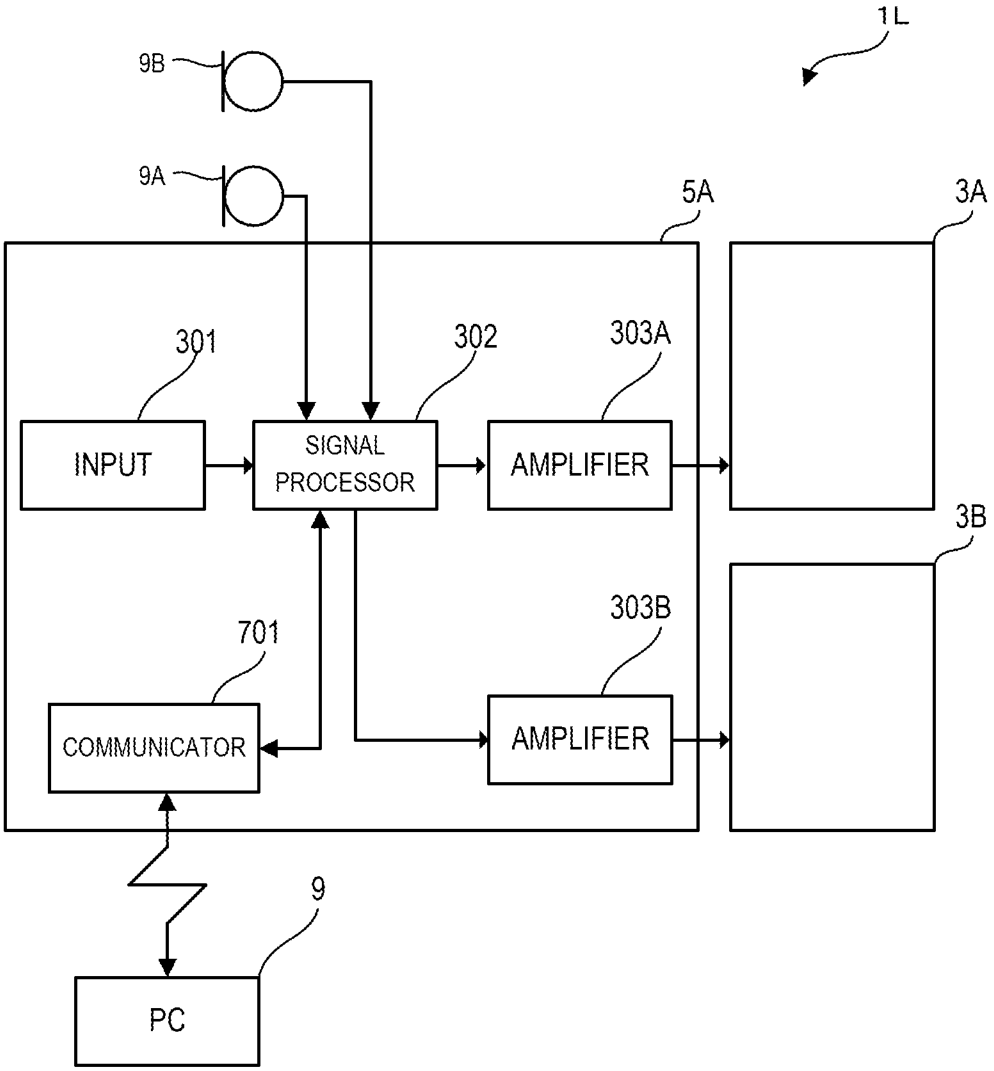
FIG. 30 is a block diagram showing a hardware configuration of a phone booth 1L according to a twelfth modification.

Subsequently, FIG. 30 is a block diagram showing a hardware configuration of a phone booth 1L according to a twelfth modification. The same reference numerals are used to refer to components common to FIG. 24, and the description will be omitted.

The phone booth 1L according to the twelfth modification includes a communicator 701. The communicator 701 is connected to the PC 9. The signal processor 302 sends and receives predetermined information to the PC 9 through the communicator 701.

The PC 9 executes an application program that works with the phone booth 1L. The application program changes a display state of the display of the PC 9 based on the content of the signal processing in the signal processor 302. For example, the PC 9 displays information on loudness of sound that leaks from the inside of the phone booth 1L to the outside or loudness of sound that intrudes from the outside to the inside, the loudness being obtained by the signal processor 302. A user adjusts a volume of the own voice according to the content of the display of the PC 9 or changes a volume of sound to be outputted from the flat speaker 3A or the flat speaker 3B.

In short, the signal processor 302 may compare the first audio signal of the sound collected by the microphone 9A and the second audio signal of the sound collected by the microphone 9B, and may control the display of the display of the PC 9 being is an external device based on a comparison result.

The configuration and advantageous effect of the present embodiments are summarized as follows.

(1) A panel combination includes a panel, a directional speaker mounted to the panel, and a controller that receives a trigger signal and controls an output of the directional speaker according to the trigger signal.

(Advantageous Effect) The panel combination, since incorporating a directional speaker and a control mechanism of the directional speaker, does not need to connect a device to other panels when a phone booth is built. Therefore, the advantage of the phone booth that is able to be easily installed, disassembled, relocated, or the like is not impaired.

(2) The panel combination may include an electrical component to be installed on the panel, and the controller may control powering on and off of the directional speaker and the electrical component.

(Advantageous Effect) The panel combination, since collecting the electrical component, the directional speaker, the control mechanism of the directional speaker and turning the power on and off in conjunction with these configurations, further improves convenience.

(3) The electrical component may include a lighting or a ventilation fan.

(Advantageous Effect) The panel combination, since being in conjunction with the electrical component such as the lighting or a ventilation fan that is required for a phone booth, further improves convenience.

(4) The directional speaker may be a flat speaker. (Advantageous Effect) Such a thin flat speaker to configure a part of the wall surface does not interfere with design and a size of a space.

(5) The flat speaker may be configured by a plurality of flat speaker units.

(Advantageous Effect) The flat speaker configured by the plurality of flat speaker units is able to easily control sound emitting direction and directivity.

(6) The directional speaker may include a first directional speaker and a second directional speaker, and the panel comprises a panel body may include a first wall surface to which the first directional speaker is attached, and a second wall surface to which the second directional speaker is attached.

(Advantageous Effect) The panel combination is able to work for both of sound that intrudes from the outside to the inside and sound that leaks from the inside to the outside.

(7) A microphone may be attached to the panel, and the controller may control the output of the directional speaker, based on an audio signal of sound collected by the microphone.

(Advantageous Effect) The panel combination is able to control the directional speaker according to an ambient sound environment.

(8) The controller may control frequency characteristics of the sound to be outputted from the directional speaker, based on the audio signal of the sound collected by the microphone.

(Advantageous Effect) The panel combination is able to optimize sound to be output from a speaker according to the ambient sound environment.

(9) The panel may be any one of a panel with a door, a panel with an air vent, or a panel configuring a ceiling surface. (Advantageous Effect) Although sound easily leaks or intrudes from a door and a ventilation fan, a directional speaker is installed near the door and the ventilation fan, which increases a masking effect. In addition, the directional speaker is installed in the panel combination being a ceiling surface, so that a user has less difficulty feeling localization of sound that reaches from above the head and thus can listen to the sound more naturally.

(10) The directional speaker may output a masking sound. (Advantageous Effect) The masking sound is suitable for a phone booth being a simple soundproof room to which sound easily leaks or from which sound easily intrudes.

The description of the embodiments of the present disclosure is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A phone booth comprising:

a plurality of panels;

a directional speaker mounted to the panel;

a controller that receives a trigger signal and controls an output of the directional speaker according to the trigger signal;

a first microphone disposed on one side of the panel disposed inside the phone booth; and a second microphone disposed on another side of the panel disposed outside the phone booth, wherein the controller compares a first audio signal of sound collected by the first microphone and a second audio signal of sound collected by the second microphone, and further controls the output of the directional speaker based on a comparison result.

2. The phone booth according to claim 1, wherein:

the first microphone collects a voice of a user of the phone booth, and the controller outputs the voice of the user that has been collected by the first microphone from the directional speaker, and adjusts a volume of the voice of the user based on the first audio signal and the second audio signal.

3. The phone booth according to claim 1, wherein the phone booth includes, a plurality of microphones, including the first microphone, each installed on one of the plurality of panels.

4. The phone booth according to claim 1, further comprising:

a display, wherein the controller controls a display state of the display, based on the first audio signal and the second audio signal.

5. A method of controlling an output of a directional speaker in a phone booth, which includes a first microphone disposed inside the phone booth, and a second microphone disposed outside the phone booth, the method comprising:

receiving a trigger signal;

controlling the output of the directional speaker according to the trigger signal; and comparing a first audio signal of sound collected by the first microphone and a second audio signal of sound collected by the second microphone; and further controlling the output of the directional speaker based on a comparison result.

6. The method according to claim 5, wherein:

the phone booth further includes an electrical component, and the trigger signal controls the output of the directional speaker by powering on and off of the directional speaker and controls powering on and off of the electrical component.

7. The method according to claim 5, further comprising controlling frequency characteristics of sound to be output from the directional speaker based on the first and second audio signals.

8. The method according to claim 5, further comprising outputting a masking sound from the directional speaker.

* * * * *